(12) United States Patent (10) Patent No.: US 8,825,576 B2
Aravamudan et al. (45) Date of Patent: *Sep. 2, 2014

(54) METHODS AND SYSTEMS FOR SELECTING AND PRESENTING CONTENT ON A FIRST SYSTEM BASED ON USER PREFERENCES LEARNED ON A SECOND SYSTEM

(71) Applicant: Veveo, Inc., Andover, MA (US)

(72) Inventors: Murali Aravamudan, Andover, MA (US); Ajit Rajasekharan, West Windsor, NJ (US); Kajamalai G. Ramakrishnan, Nashua, NH (US)

(73) Assignee: Veveo, Inc., Andover, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/959,289

(22) Filed: Aug. 5, 2013

(65) Prior Publication Data

US 2013/0325843 A1 Dec. 5, 2013

Related U.S. Application Data

(63) Continuation of application No. 13/021,086, filed on Feb. 4, 2011, now Pat. No. 8,543,516, which is a continuation of application No. 12/882,451, filed on Sep. 15, 2010, now Pat. No. 7,885,904, which is a continuation of application No. 11/682,588, filed on Mar. 6, 2007, now Pat. No. 7,835,998.

(60) Provisional application No. 60/779,547, filed on Mar. 6, 2006, provisional application No. 60/784,027, filed on Mar. 20, 2006, provisional application No. 60/796,614, filed on May 1, 2006, provisional application No. 60/834,966, filed on Aug. 2, 2006.

(51) Int. Cl.
*G06F 17/00* (2006.01)

(52) U.S. Cl.
USPC .......................................................... 706/45

(58) Field of Classification Search
None
See application file for complete search history.

(56) References Cited

U.S. PATENT DOCUMENTS 252,873 A 1/1882 Freese
1,261,167 A 4/1918 Russell (Continued)

FOREIGN PATENT DOCUMENTS

EP 181058 5/1986
EP 1050794 A 11/2000

(Continued)

OTHER PUBLICATIONS

Ardissono, L. et al., User Modeling and Recommendation Techniques for Personalized Electronic Program Guides, Personalized Digital Television,Editors: Ardissono, et al., Kluwer Academic Press, 2004. (27 pages).

(Continued)

*Primary Examiner* — Li-Wu Chang
*Assistant Examiner* — David H Kim
(74) *Attorney, Agent, or Firm* — Wilmer Cutler Pickering Hale and Dorr LLP

(57) ABSTRACT

A method of selecting and presenting content on a first system based on user preferences learned on a second system is provided. The method includes receiving a user's input for identifying items of the second content system and, in response thereto, presenting a subset of items of the second content system and receiving the user's selection actions thereof. The method includes analyzing the selected items to learn the user's content preferences for the content of the second content system and determining a relationship between the content of the first and second content systems to determine preferences relevant to items of the first content system. The method includes, in response subsequent user input for items of the first content system, selecting and ordering a collection of items of the first content system based on the user's learned content preferences determined to be relevant to the items of the first content system.

10 Claims, 14 Drawing Sheets

(56) References Cited

U.S. PATENT DOCUMENTS

| | | |
|---|---|---|
| 4,045,777 A | 8/1977 | Mierzwinski et al. |
| 4,453,217 A | 6/1984 | Boivie |
| 4,760,528 A | 7/1988 | Levin |
| 4,797,855 A | 1/1989 | Duncan, IV et al. |
| 4,893,238 A | 1/1990 | Venema |
| 5,224,060 A | 6/1993 | Ma |
| 5,337,347 A | 8/1994 | Halstead-Nussloch et al. |
| 5,369,605 A | 11/1994 | Parks |
| 5,487,616 A | 1/1996 | Ichbiah |
| 5,532,754 A | 7/1996 | Young et al. |
| 5,557,686 A | 9/1996 | Brown et al. |
| 5,623,406 A | 4/1997 | Ichbiah |
| 5,635,989 A | 6/1997 | Rothmuller |
| 5,745,889 A | 4/1998 | Burrows |
| 5,774,588 A | 6/1998 | Li |
| 5,802,361 A | 9/1998 | Wang et al. |
| 5,805,155 A | 9/1998 | Allibhoy et al. |
| 5,818,437 A | 10/1998 | Grover et al. |
| 5,828,420 A | 10/1998 | Marshall et al. |
| 5,828,991 A | 10/1998 | Skiena et al. |
| 5,835,087 A | 11/1998 | Herz et al. |
| 5,859,662 A | 1/1999 | Cragun et al. |
| 5,872,834 A | 2/1999 | Teitelbaum |
| 5,880,768 A | 3/1999 | Lemmons et al. |
| 5,896,444 A | 4/1999 | Perlman et al. |
| 5,912,664 A | 6/1999 | Eick et al. |
| 5,930,788 A | 7/1999 | Wical |
| 5,937,422 A | 8/1999 | Nelson et al. |
| 5,945,928 A | 8/1999 | Kushler et al. |
| 5,945,987 A | 8/1999 | Dunn |
| 5,953,541 A | 9/1999 | King et al. |
| 6,005,565 A | 12/1999 | Legall et al. |
| 6,005,597 A | 12/1999 | Barrett et al. |
| 6,006,225 A | 12/1999 | Bowman et al. |
| 6,008,799 A | 12/1999 | Van Kleeck |
| 6,009,459 A | 12/1999 | Belfiore et al. |
| 6,011,554 A | 1/2000 | King et al. |
| 6,041,311 A | 3/2000 | Chislenko et al. |
| 6,047,300 A | 4/2000 | Walfish et al. |
| 6,075,526 A | 6/2000 | Rothmuller |
| 6,133,909 A | 10/2000 | Schein et al. |
| 6,169,984 B1 | 1/2001 | Bogdan |
| 6,184,877 B1 | 2/2001 | Dodson et al. |
| 6,189,002 B1 | 2/2001 | Roitblat |
| 6,204,848 B1 | 3/2001 | Nowlan et al. |
| 6,223,059 B1 | 4/2001 | Haestrup |
| 6,260,050 B1 | 7/2001 | Yost et al. |
| 6,266,048 B1 | 7/2001 | Carau, Sr. |
| 6,266,814 B1 | 7/2001 | Lemmons et al. |
| 6,269,361 B1 | 7/2001 | Davis et al. |
| 6,286,064 B1 | 9/2001 | King et al. |
| 6,292,804 B1 | 9/2001 | Ardoin et al. |
| 6,307,548 B1 | 10/2001 | Flinchem et al. |
| 6,307,549 B1 | 10/2001 | King et al. |
| 6,360,215 B1 | 3/2002 | Judd et al. |
| 6,377,945 B1 | 4/2002 | Risvik |
| 6,383,080 B1 | 5/2002 | Link et al. |
| 6,385,602 B1 | 5/2002 | Tso et al. |
| 6,392,640 B1 | 5/2002 | Will |
| 6,438,579 B1 | 8/2002 | Hosken et al. |
| 6,438,751 B1 | 8/2002 | Voyticky et al. |
| 6,463,586 B1 | 10/2002 | Jerding |
| 6,466,933 B1 | 10/2002 | Huang et al. |
| 6,529,903 B2 | 3/2003 | Smith |
| 6,543,052 B1 | 4/2003 | Ogasawara |
| 6,564,213 B1 | 5/2003 | Ortega et al. |
| 6,564,313 B1 | 5/2003 | Kashyap |
| 6,594,657 B1 | 7/2003 | Livowsky et al. |
| 6,600,496 B1 | 7/2003 | Wagner et al. |
| 6,614,422 B1 | 9/2003 | Rafii et al. |
| 6,614,455 B1 | 9/2003 | Cuijpers et al. |
| 6,615,248 B1 | 9/2003 | Smith |
| 6,622,148 B1 | 9/2003 | Noble et al. |
| 6,631,496 B1 | 10/2003 | Li et al. |
| 6,662,177 B1 | 12/2003 | Martino et al. |
| 6,664,980 B2 | 12/2003 | Bryan et al. |
| 6,708,336 B1 | 3/2004 | Bruette |
| 6,721,954 B1 | 4/2004 | Nickum |
| 6,732,369 B1 | 5/2004 | Schein et al. |
| 6,734,881 B1 | 5/2004 | Will |
| 6,735,695 B1 | 5/2004 | Gopalakrishnan et al. |
| 6,757,906 B1 | 6/2004 | Look et al. |
| 6,766,526 B1 | 7/2004 | Ellis |
| 6,772,147 B2 | 8/2004 | Wang |
| 6,785,671 B1 | 8/2004 | Bailey et al. |
| 6,801,909 B2 | 10/2004 | Delgado et al. |
| 6,835,602 B2 | 12/2004 | Norskov et al. |
| 6,839,702 B1 | 1/2005 | Patel et al. |
| 6,839,705 B1 | 1/2005 | Grooters |
| 6,850,693 B2 | 2/2005 | Young et al. |
| 6,865,575 B1 | 3/2005 | Smith |
| 6,865,746 B1 | 3/2005 | Herrington et al. |
| 6,907,273 B1 | 6/2005 | Smethers |
| 6,918,131 B1* | 7/2005 | Rautila et al. .................. 725/34 |
| 6,965,374 B2 | 11/2005 | Villet et al. |
| 6,999,959 B1 | 2/2006 | Lawrence et al. |
| 7,013,304 B1 | 3/2006 | Schuetze et al. |
| 7,117,207 B1 | 10/2006 | Kerschberg et al. |
| 7,130,814 B1 | 10/2006 | Szabo et al. |
| 7,130,866 B2 | 10/2006 | Schaffer |
| 7,136,845 B2 | 11/2006 | Chandrasekar et al. |
| 7,136,854 B2 | 11/2006 | Smith |
| 7,146,627 B1 | 12/2006 | Ismail et al. |
| 7,149,983 B1 | 12/2006 | Robertson et al. |
| 7,191,238 B2 | 3/2007 | Uchida |
| 7,213,256 B1 | 5/2007 | Kikinis |
| 7,225,180 B2 | 5/2007 | Donaldson et al. |
| 7,225,184 B2 | 5/2007 | Carrasco et al. |
| 7,225,455 B2 | 5/2007 | Bennington et al. |
| 7,269,548 B2 | 9/2007 | Fux et al. |
| 7,293,231 B1 | 11/2007 | Gunn et al. |
| 7,461,061 B2 | 12/2008 | Aravamudan et al. |
| 7,487,151 B2 | 2/2009 | Yamamoto et al. |
| 7,509,313 B2 | 3/2009 | Colledge et al. |
| 7,529,741 B2 | 5/2009 | Aravamudan et al. |
| 7,529,744 B1 | 5/2009 | Srivastava et al. |
| 7,536,384 B2 | 5/2009 | Venkataraman et al. |
| 7,536,854 B2 | 5/2009 | Da-Silva et al. |
| 7,539,676 B2 | 5/2009 | Aravamudan et al. |
| 7,548,915 B2 | 6/2009 | Ramer et al. |
| 7,567,958 B1 | 7/2009 | Alspector et al. |
| 7,594,244 B2 | 9/2009 | Scholl et al. |
| 7,644,054 B2 | 1/2010 | Garg et al. |
| 7,657,526 B2 | 2/2010 | Aravamudan et al. |
| 7,679,534 B2 | 3/2010 | Kay et al. |
| 7,683,886 B2 | 3/2010 | Willey |
| 7,685,197 B2 | 3/2010 | Fain et al. |
| 7,712,053 B2 | 5/2010 | Bradford et al. |
| 7,725,485 B1 | 5/2010 | Sahami et al. |
| 7,725,486 B2 | 5/2010 | Tsuzuki et al. |
| 7,739,280 B2 | 6/2010 | Aravamudan et al. |
| 7,757,250 B1 | 7/2010 | Horvitz et al. |
| 7,774,294 B2 | 8/2010 | Aravamudan et al. |
| 7,774,341 B2 | 8/2010 | Aravamudan et al. |
| 7,779,011 B2 | 8/2010 | Venkataraman et al. |
| 7,788,266 B2 | 8/2010 | Venkataraman et al. |
| 7,792,815 B2 | 9/2010 | Aravamudan et al. |
| 7,835,998 B2 | 11/2010 | Aravamudan et al. |
| 7,987,182 B2* | 7/2011 | Slothouber et al. ........... 707/722 |
| 2001/0044759 A1 | 11/2001 | Kutsumi et al. |
| 2002/0002550 A1 | 1/2002 | Berman |
| 2002/0042791 A1 | 4/2002 | Smith et al. |
| 2002/0049752 A1 | 4/2002 | Bowman et al. |
| 2002/0052873 A1 | 5/2002 | Delgado et al. |
| 2002/0059066 A1 | 5/2002 | O'Hagan |
| 2002/0059621 A1 | 5/2002 | Thomas et al. |
| 2002/0077143 A1 | 6/2002 | Sharif et al. |
| 2002/0083448 A1 | 6/2002 | Johnson |
| 2002/0116291 A1 | 8/2002 | Grasso et al. |
| 2002/0120925 A1 | 8/2002 | Logan |
| 2002/0133481 A1 | 9/2002 | Smith et al. |
| 2002/0144267 A1 | 10/2002 | Gutta et al. |
| 2002/0151327 A1 | 10/2002 | Levitt |
| 2002/0152190 A1 | 10/2002 | Biebesheimer et al. |

(56) References Cited

U.S. PATENT DOCUMENTS

| | | |
|---|---|---|
| 2002/0184373 A1 | 12/2002 | Maes |
| 2002/0188488 A1 | 12/2002 | Hinkle |
| 2002/0199194 A1 | 12/2002 | Ali |
| 2003/0005452 A1 | 1/2003 | Rodriguez |
| 2003/0005462 A1 | 1/2003 | Broadus et al. |
| 2003/0011573 A1 | 1/2003 | Villet et al. |
| 2003/0014753 A1 | 1/2003 | Beach et al. |
| 2003/0023976 A1 | 1/2003 | Kamen et al. |
| 2003/0033292 A1 | 2/2003 | Meisel et al. |
| 2003/0037043 A1 | 2/2003 | Chang et al. |
| 2003/0037333 A1 | 2/2003 | Ghashghai et al. |
| 2003/0046698 A1 | 3/2003 | Kamen et al. |
| 2003/0051240 A1 | 3/2003 | Schaffer et al. |
| 2003/0066068 A1 | 4/2003 | Gutta et al. |
| 2003/0066079 A1 | 4/2003 | Suga |
| 2003/0067495 A1 | 4/2003 | Pu et al. |
| 2003/0084270 A1 | 5/2003 | Coon et al. |
| 2003/0097661 A1 | 5/2003 | Li et al. |
| 2003/0103088 A1 | 6/2003 | Dresti et al. |
| 2003/0135464 A1 | 7/2003 | Mourad et al. |
| 2003/0154138 A1 | 8/2003 | Phillips et al. |
| 2003/0217121 A1 | 11/2003 | Willis |
| 2003/0226146 A1 | 12/2003 | Thurston et al. |
| 2003/0229900 A1 | 12/2003 | Reisman |
| 2003/0237096 A1 | 12/2003 | Barrett et al. |
| 2004/0013909 A1 | 1/2004 | Shimizu et al. |
| 2004/0021691 A1 | 2/2004 | Dostie et al. |
| 2004/0024777 A1 | 2/2004 | Schaffer |
| 2004/0034652 A1 | 2/2004 | Hofmann et al. |
| 2004/0046744 A1 | 3/2004 | Rafii et al. |
| 2004/0049783 A1 | 3/2004 | Lemmons et al. |
| 2004/0054520 A1 | 3/2004 | Dehlinger et al. |
| 2004/0073432 A1 | 4/2004 | Stone |
| 2004/0073926 A1 | 4/2004 | Nakamura et al. |
| 2004/0078815 A1 | 4/2004 | Lemmons et al. |
| 2004/0078816 A1 | 4/2004 | Johnson |
| 2004/0078820 A1 | 4/2004 | Nickum |
| 2004/0083198 A1 | 4/2004 | Bradford et al. |
| 2004/0093616 A1 | 5/2004 | Johnson |
| 2004/0111745 A1 | 6/2004 | Schein et al. |
| 2004/0128686 A1 | 7/2004 | Boyer et al. |
| 2004/0137416 A1 | 7/2004 | Ma et al. |
| 2004/0139091 A1 | 7/2004 | Shin |
| 2004/0143569 A1 | 7/2004 | Gross et al. |
| 2004/0155908 A1 | 8/2004 | Wagner |
| 2004/0163032 A1 | 8/2004 | Guo et al. |
| 2004/0194141 A1 | 9/2004 | Sanders |
| 2004/0205065 A1 | 10/2004 | Petras et al. |
| 2004/0216160 A1 | 10/2004 | Lemmons et al. |
| 2004/0220926 A1 | 11/2004 | Lamkin et al. |
| 2004/0221308 A1 | 11/2004 | Cuttner et al. |
| 2004/0254911 A1 | 12/2004 | Grasso et al. |
| 2004/0261021 A1 | 12/2004 | Mittal et al. |
| 2005/0015366 A1 | 1/2005 | Carrasco et al. |
| 2005/0038702 A1 | 2/2005 | Merriman et al. |
| 2005/0071874 A1 | 3/2005 | Elcock et al. |
| 2005/0079895 A1 | 4/2005 | Kalenius et al. |
| 2005/0086234 A1 | 4/2005 | Tosey |
| 2005/0086691 A1 | 4/2005 | Dudkiewicz et al. |
| 2005/0086692 A1 | 4/2005 | Dudkiewicz et al. |
| 2005/0097311 A1 | 5/2005 | Gopalakrishnan et al. |
| 2005/0125307 A1 | 6/2005 | Hunt et al. |
| 2005/0129199 A1 | 6/2005 | Abe |
| 2005/0174333 A1 | 8/2005 | Robinson et al. |
| 2005/0187945 A1 | 8/2005 | Ehrich et al. |
| 2005/0192944 A1 | 9/2005 | Flinchem |
| 2005/0210020 A1 | 9/2005 | Gunn et al. |
| 2005/0210383 A1 | 9/2005 | Cucerzan et al. |
| 2005/0210402 A1 | 9/2005 | Gunn et al. |
| 2005/0223308 A1 | 10/2005 | Gunn et al. |
| 2005/0240580 A1 | 10/2005 | Zamir et al. |
| 2005/0246311 A1 | 11/2005 | Whelan et al. |
| 2005/0246324 A1 | 11/2005 | Paalasmaa et al. |
| 2005/0267994 A1 | 12/2005 | Wong et al. |
| 2005/0278175 A1 | 12/2005 | Hyvonen |
| 2005/0283468 A1 | 12/2005 | Kamvar et al. |
| 2006/0010477 A1 | 1/2006 | Yu |
| 2006/0010503 A1 | 1/2006 | Inoue et al. |
| 2006/0013487 A1 | 1/2006 | Longe et al. |
| 2006/0015906 A1 | 1/2006 | Boyer et al. |
| 2006/0020662 A1 | 1/2006 | Robinson |
| 2006/0036640 A1 | 2/2006 | Tateno et al. |
| 2006/0041843 A1 | 2/2006 | Billsus et al. |
| 2006/0044277 A1 | 3/2006 | Fux et al. |
| 2006/0059044 A1 | 3/2006 | Chan et al. |
| 2006/0069616 A1 | 3/2006 | Bau |
| 2006/0075429 A1 | 4/2006 | Istvan et al. |
| 2006/0090182 A1 | 4/2006 | Horowitz et al. |
| 2006/0090185 A1 | 4/2006 | Zito et al. |
| 2006/0090812 A1 | 5/2006 | Summerville |
| 2006/0098899 A1 | 5/2006 | King et al. |
| 2006/0101499 A1 | 5/2006 | Aravamudan et al. |
| 2006/0101503 A1 | 5/2006 | Venkataraman et al. |
| 2006/0101504 A1 | 5/2006 | Aravamudan et al. |
| 2006/0106782 A1 | 5/2006 | Blumenau et al. |
| 2006/0112162 A1 | 5/2006 | Marot et al. |
| 2006/0117019 A1 | 6/2006 | Sylthe et al. |
| 2006/0128301 A1 | 6/2006 | Dorfstatter et al. |
| 2006/0136379 A1 | 6/2006 | Marino et al. |
| 2006/0156233 A1 | 7/2006 | Nurmi |
| 2006/0161520 A1 | 7/2006 | Brewer et al. |
| 2006/0163337 A1 | 7/2006 | Unruh |
| 2006/0167676 A1 | 7/2006 | Plumb |
| 2006/0167859 A1 | 7/2006 | Verbeck Sibley et al. |
| 2006/0173818 A1 | 8/2006 | Berstis et al. |
| 2006/0176283 A1 | 8/2006 | Suraqui |
| 2006/0184989 A1 | 8/2006 | Slothouber |
| 2006/0190308 A1 | 8/2006 | Janssens et al. |
| 2006/0195435 A1 | 8/2006 | Laird-McConnell et al. |
| 2006/0206454 A1 | 9/2006 | Forstall et al. |
| 2006/0206815 A1 | 9/2006 | Pathiyal et al. |
| 2006/0242178 A1 | 10/2006 | Butterfield et al. |
| 2006/0242607 A1 | 10/2006 | Hudson |
| 2006/0248078 A1 | 11/2006 | Gross et al. |
| 2006/0256070 A1 | 11/2006 | Moosavi et al. |
| 2006/0256078 A1 | 11/2006 | Flinchem et al. |
| 2006/0259344 A1 | 11/2006 | Patel et al. |
| 2006/0259479 A1 | 11/2006 | Dai |
| 2006/0261021 A1 | 11/2006 | Stagnaro |
| 2006/0271552 A1 | 11/2006 | McChesney et al. |
| 2006/0274051 A1 | 12/2006 | Longe et al. |
| 2006/0282856 A1 | 12/2006 | Errico et al. |
| 2007/0005526 A1 | 1/2007 | Whitney et al. |
| 2007/0005563 A1 | 1/2007 | Aravamudan |
| 2007/0005576 A1 | 1/2007 | Cutrell et al. |
| 2007/0016476 A1 | 1/2007 | Hoffberg et al. |
| 2007/0016862 A1 | 1/2007 | Kuzmin |
| 2007/0027852 A1 | 2/2007 | Howard et al. |
| 2007/0027861 A1 | 2/2007 | Huentelman et al. |
| 2007/0027871 A1 | 2/2007 | Arbajian |
| 2007/0043750 A1 | 2/2007 | Dingle |
| 2007/0044122 A1 | 2/2007 | Scholl et al. |
| 2007/0050337 A1 | 3/2007 | Venkataraman et al. |
| 2007/0050348 A1 | 3/2007 | Aharoni et al. |
| 2007/0061244 A1 | 3/2007 | Ramer et al. |
| 2007/0061317 A1 | 3/2007 | Ramer et al. |
| 2007/0061321 A1 | 3/2007 | Venkataraman et al. |
| 2007/0061753 A1 | 3/2007 | Ng et al. |
| 2007/0061754 A1 | 3/2007 | Ardhanari et al. |
| 2007/0067272 A1 | 3/2007 | Flynt et al. |
| 2007/0074131 A1 | 3/2007 | Assadollahi |
| 2007/0088681 A1 | 4/2007 | Aravamudan et al. |
| 2007/0094024 A1 | 4/2007 | Kristensson et al. |
| 2007/0100650 A1 | 5/2007 | Ramer et al. |
| 2007/0104456 A1 | 5/2007 | Craner |
| 2007/0130128 A1 | 6/2007 | Garg et al. |
| 2007/0143567 A1 | 6/2007 | Gorobets |
| 2007/0150606 A1 | 6/2007 | Flinchem et al. |
| 2007/0182595 A1 | 8/2007 | Ghasabian |
| 2007/0208718 A1 | 9/2007 | Javid et al. |
| 2007/0219984 A1 | 9/2007 | Aravamudan et al. |
| 2007/0219985 A1 | 9/2007 | Aravamudan et al. |
| 2007/0226649 A1 | 9/2007 | Agmon |
| 2007/0240045 A1 | 10/2007 | Fux et al. |

(56) References Cited

U.S. PATENT DOCUMENTS

| | | | |
|---|---|---|---|
| 2007/0242178 | A1 | 10/2007 | Kawasaki et al. |
| 2007/0255693 | A1 | 11/2007 | Ramaswamy et al. |
| 2007/0256070 | A1 | 11/2007 | Bykov et al. |
| 2007/0260703 | A1 | 11/2007 | Ardhanari et al. |
| 2007/0266021 | A1 | 11/2007 | Aravamudan et al. |
| 2007/0266026 | A1 | 11/2007 | Aravamudan et al. |
| 2007/0266406 | A1 | 11/2007 | Aravamudan et al. |
| 2007/0271205 | A1 | 11/2007 | Aravamudan et al. |
| 2007/0276773 | A1 | 11/2007 | Aravamudan et al. |
| 2007/0276821 | A1 | 11/2007 | Aravamudan et al. |
| 2007/0276859 | A1 | 11/2007 | Aravamudan et al. |
| 2007/0288456 | A1 | 12/2007 | Aravamudan et al. |
| 2007/0288457 | A1 | 12/2007 | Aravamudan et al. |
| 2008/0065617 | A1 | 3/2008 | Burke et al. |
| 2008/0071771 | A1 | 3/2008 | Venkataraman et al. |
| 2008/0077577 | A1 | 3/2008 | Byrne et al. |
| 2008/0086704 | A1 | 4/2008 | Aravamudan |
| 2008/0109401 | A1 | 5/2008 | Sareen et al. |
| 2008/0114743 | A1 | 5/2008 | Venkataraman et al. |
| 2008/0177717 | A1 | 7/2008 | Kumar et al. |
| 2008/0195601 | A1 | 8/2008 | Ntoulas et al. |
| 2008/0209229 | A1 | 8/2008 | Ramakrishnan et al. |
| 2008/0313564 | A1 | 12/2008 | Barve et al. |
| 2009/0077496 | A1 | 3/2009 | Aravamudan et al. |
| 2009/0198688 | A1 | 8/2009 | Venkataraman et al. |
| 2009/0217203 | A1 | 8/2009 | Aravamudan et al. |
| 2010/0121845 | A1 | 5/2010 | Aravamudan et al. |
| 2010/0153380 | A1 | 6/2010 | Garg et al. |
| 2010/0241625 | A1 | 9/2010 | Aravamudan et al. |
| 2010/0293160 | A1 | 11/2010 | Aravamudan et al. |
| 2010/0325111 | A1 | 12/2010 | Aravamudan et al. |

FOREIGN PATENT DOCUMENTS

| | | |
|---|---|---|
| EP | 1143691 | 10/2001 |
| EP | 1338967 A2 | 8/2003 |
| EP | 1338976 | 8/2003 |
| EP | 1458193 | 9/2004 |
| EP | 1463307 A2 | 9/2004 |
| EP | 1622054 | 2/2006 |
| EP | 1810120 | 7/2007 |
| EP | 1810508 | 7/2007 |
| EP | 1955130 | 8/2008 |
| EP | 2016513 | 1/2009 |
| EP | 2062171 | 5/2009 |
| JP | 2009534761 | 9/2009 |
| JP | 2010-503931 | 2/2010 |
| WO | WO-199856173 | 12/1998 |
| WO | WO-0070505 | 11/2000 |
| WO | WO-2004010326 | 1/2004 |
| WO | WO-2005174333 | 1/2004 |
| WO | WO-2004031931 A1 | 4/2004 |
| WO | WO-2005033967 | 4/2005 |
| WO | WO-2005054982 A2 | 6/2005 |
| WO | WO-2005084235 | 9/2005 |
| WO | WO-2005084235 A2 | 9/2005 |
| WO | WO-2006052959 | 5/2006 |
| WO | WO-2006052966 | 5/2006 |
| WO | WO-2007025148 | 3/2007 |
| WO | WO-2007025149 | 3/2007 |
| WO | WO-2007062035 | 5/2007 |
| WO | WO-2007118038 | 10/2007 |
| WO | WO-2007124429 | 11/2007 |
| WO | WO-2007124436 A2 | 11/2007 |
| WO | WO-2007131058 | 11/2007 |
| WO | WO-2008034057 | 3/2008 |
| WO | WO-2008091941 | 7/2008 |
| WO | WO-2008063987 | 8/2008 |
| WO | WO-2008148012 | 12/2008 |

OTHER PUBLICATIONS

Benes, V.E., "Mathematical Theory of Connecting Networks and Telephone Traffic," Academic Press, NY, 1965 (4 pages).

Dalianis, "Improving search engine retrieval using a compound splitter for Swedish," Abstract of presentation at Nodalida 2005—15th Nordic Conference on Computational Linguistics, Joensuu Finland, May 21-22, 2005. Retrieved Jan. 5, 2006 from http://phon.joensuu.fi/nodalida/abstracts/03.shtml, 3 pages.

Digital Video Broadcasting, http://www.dvb.org (Oct. 12, 2007) (2 pages).

Duff, I.S. et al., "Direct Methods for Sparse Matrices," Monographs on Numerical Analysis, Oxford Science Publications, Clarendon Press, Oxford, 1986 (7 pages).

Gadd, Phonix: The Algorith, Program, vol. 24(4), Oct. 1990 (pp. 363-369).

Garey, M.R. et al., "Computers and Intractability a Guide to the Theory of NP-Completeness," W.H. Freeman and Co., New York, 1979 (2 pages).

Good, N. et al., Combining Collaborative Filtering with Personal Agents for Better Recommendations, in Proc. of the 16th National Conference on Artificial Intelligence, pp. 439-446, Orlando, Florida, Jul. 18-22, 1999.

Hildrebrand, F.B., "Introduction to Numerical Analysis," Second Ed., McGraw-Hill Book Co., New York, 1974.

International Search Report and Written Opinion of the International Searching Authority of the United States Patent and Trademark Office for PCT/US2005/040415, dated Nov. 27, 2006, 6 pages.

International Search Report and Written Opinion of the International Searching Authority of the United States Patent and Trademark Office for PCT/US2005/040424, dated Nov. 21, 2006, 6 pages.

International Search Report and Written Opinion of the International Searching Authority of the United States Patent and Trademark Office for PCT/US2005/040517, mailed Jun. 13, 2008, 4 pages.

International Search Report and Written Opinion of the International Searching Authority of the United States Patent and Trademark Office for PCT/US2006/025249, mailed Jan. 29, 2008, 5 pages.

International Search Report and Written Opinion of the International Searching Authority of the United States Patent and Trademark Office for PCT/US2006/033204, mailed Sep. 21, 2007, 5 pages.

International Search Report and Written Opinion of the International Searching Authority of the United States Patent and Trademark Office for PCT/US2006/033257, dated Mar. 26, 2008, 6 pages.

International Search Report and Written Opinion of the International Searching Authority of the United States Patent and Trademark Office for PCT/US2006/033258, dated Mar. 26, 2008, 5 pages.

International Search Report and Written Opinion of the International Searching Authority of the United States Patent and Trademark Office for PCT/US2006/045053, dated Jul. 24, 2008, 10 pages.

International Search Report and Written Opinion of the International Searching Authority of the United States Patent and Trademark Office for PCT/US2006/40005, mailed Jul. 3, 2007, 8 pages.

International Search Report and Written Opinion of the International Searching Authority of the United States Patent and Trademark Office for PCT/US2007/067100, mailed Mar. 7, 2008, 5 pages.

International Search Report and Written Opinion of the International Searching Authority of the United States Patent and Trademark Office for PCT/US2007/067114, dated Jul. 2, 2008, 6 pages.

International Search Report and Written Opinion of the International Searching Authority of the United States Patent and Trademark Office for PCT/US2007/068064, dated Jul. 7, 2008, 11 pages.

International Search Report and Written Opinion of the International Searching Authority of the United States Patent and Trademark Office for PCT/US2007/078490, dated Jul. 4, 2008, 4 pages.

International Search Report and Written Opinion of the International Searching Authority of the United States Patent and Trademark Office for PCT/US2007/084500, dated May 20, 2008, 8 pages.

International Search Report and Written Opinion of the International Searching Authority of the United States Patent and Trademark Office for PCT/US2008/051789, dated Jul. 14, 2008, 7 pages.

International Search Report and Written Opinion of the International Searching Authority of the United States Patent and Trademark Office for PCT/US2008/064730, dated Sep. 8, 2008, 7 pages.

International Search Report and Written Opinion of the International Searching Authority, the United States Patent and Trademark Office, dated Jan. 25, 2008, for PCT/US2007/065703, 6 pages.

(56) References Cited

OTHER PUBLICATIONS

Kurapati, et al., "A Multi-Agent TV Recommender," In Proceedings of the UM 2001 Workshop "Personalization in Future TV," 2001, 8 pages.

Lindgren, B.W. et al., "Introduction to Probability and Statistics," MacMillan Publishing Co., New York, New York, 1978.

Luenberger, D.G., "Linear and Nonlinear Programming," Second Ed., Addison-Wesley Publishing Company, Reading, MA, 1989.

MacKenzie et al., LetterWise: Prefix-based disambiguation for mobile text input, Proceedings of the ACM Symposium on User Interface Software and Technology—UIST2001, pp. 111-120.

Matthom, "Text Highlighting in Search Results", Jul. 22, 2005. Available at www.matthom.com/archive/2005/07/22/text-highlighting-in-search-results; retrieved Jun. 23, 2006. (4 pages).

Mokotoff, Soundexing and Genealogy, Available at http://www.avotaynu.com/soundex.html, retrieved Mar. 19, 2008, last updated Sep. 8, 2007 (6 pages).

Murray et al., "Inferring Demographic Attributes of Anonymous Internet Users," WEBKDD '99 LNAI, 1836, pp. 7-20, 2000.

Nardi, et al., "Integrating Communication and Information Through Contact Map," Communications of the ACM, vol. 45, No. 4, Apr. 2002, 7 pages, retrieved from URL:http://portal.acm.org/citation.cfm?id+505251>.

Nemhauser, G.L. et al., "Integer and Combinational Optimization," John Wiley and Sons, New York, 1988 (2 pages).

Office Action for U.S. Appl. No. 11/204,546 mailed Jul. 8, 2008, 30 pages.

Office Action for U.S. Appl. No. 11/204,546 mailed Mar. 3, 2009, 26 pages.

Office Action for U.S. Appl. No. 11/204,546 mailed Sep. 17, 2009, 34 pages.

Press Release from Tegic Communications, Tegic Communications is awarded patent for Japanese T9(R) text input software from the Japan Patent Office, Oct. 12, 2004. Retrieved Nov. 18, 2005 from http://www.tegic.com/press_view.html?release_num=55254242 (4 pages).

Review of Personalization Technologies: Collaborative Filtering vs. ChoiceStream's Attributized Bayesian Choice Modeling, Technology Brief, ChoiceStream Technologies, Cambridge, MA, Feb. 2004, 13 pages.

Roe, et al., "Mapping UML Models Incorporating OCL Constraints into Object-Z," Technical Report, Sep. 2003, Department of Computing, Imperial College London, retrieved on Jul. 12, 2007, retrieved from the internet: <URL: http://www.doc.ic.ac.uk/-ar3/TechnicalReport2003_9.pdf>, 17 pages.

Silfverberg et al., Predicting text entry speed on mobile phones, Proceedings of the ACM Conference on Human Factors in Computing System—Chi, 2000. pp. 1-16.

Supplemental European Search Report for EP05826114.0 dated Aug. 20, 2009, 13 pages.

Supplemental European Search Report for EP05826129.8, dated Aug. 11, 2009, 15 pages.

Supplemental European Search Report for EP06838179.7, dated Dec. 9, 2009, 7 pages.

Supplemental European Search Report for EP07761026.9 dated Jan. 28, 2010, 8 pages.

Supplementary European Search Report and Written Opinion for EP07842499, dated Aug. 26, 2010, 6 pages.

Talbot, David. "Soul of a New Mobile Machine." *Technology Review: The Design Issue* May/Jun. 2007. (pp. 46-53).

Turski, et al., "Inner Circle—People Centered Email Client," CHI 2005 Conference on Human Factors in Computing Systems, Apr. 2005, pp. 1845-1848, 4 pages, retrieved from URL:http://portal.acm.org/citation.cfm?id+1056808.1057037.

Villani, et al., Keystroke Biometric Recognition Studies on Long-Text Input under Ideal and Application-Oriented Conditions, Proceedings of Student/Faculty Research Day, CSIS, Pace University, May 2006, pp. C3.1-C3.8, retrieved from URL: <http://www.csis.pace.edu/-ctappert/srd2006/c3.pdf>, p. 6, para 6.

Wikipedia's entry for Levenshtein distance (n.d.). Retrieved Nov. 15, 2006 from http://en.wikipedia.org/wiki/Levenshtein_distance (9 pages).

Zimmerman, et al., "TV Personalization System Design of a TV Show Recommender Engine and Interface," In Liliana Ardissono, Alfred Kobsa, Mark Maybury (eds) Personalized Digital Television: Targeting Programs to Individual Viewers, Kluwer: 27-52, 29 pages, 2004.

\* cited by examiner

METHODS AND SYSTEMS FOR SELECTING AND PRESENTING CONTENT ON A FIRST SYSTEM BASED ON USER PREFERENCES LEARNED ON A SECOND SYSTEM

CROSS-REFERENCE TO RELATED APPLICATIONS

This application is a continuation of U.S. patent application Ser. No. 13/021,086, entitled Methods and Systems For Selecting and Presenting Content On A First System Based On User Preferences Learned On A Second System, filed Feb. 4, 2011, which is a continuation of U.S. patent application Ser. No. 12/882,451, entitled Methods and Systems For Selecting and Presenting Content On A First System Based On User Preferences Learned On A Second System, filed Sep. 15, 2010, now U.S. Pat. No. 7,885,904, which is a continuation of U.S. patent application Ser. No. 11/682,588, entitled Methods and Systems For Selecting and Presenting Content On A First System Based On User Preferences Learned On A Second System, filed Mar. 6, 2007, now U.S. Pat. No. 7,835,998, which claims the benefit of the following applications:

U.S. Provisional Application No. 60/779,547, entitled A Framework for Learning User Behavior With Stochastic Signatures, filed Mar. 6, 2006;

U.S. Provisional Application No. 60/784,027, entitled A System And Method For Service Solicitation Enhanced With Relevant Personal Context to Elicit Targeted Response, filed Mar. 20, 2006;

U.S. Provisional Application No. 60/796,614, entitled A Learning Model For Multiple Dataspaces With Applications To Mobile Environment, filed May 1, 2006; and U.S. Provisional Application No. 60/834,966, entitled Seminormalization Of Signatures For Reducing Truncation Errors And Stabilizing Relevance Promotion, filed Aug. 2, 2006, the contents of each of the above applications are incorporated by reference herein.

This application is related to the following applications, filed on Mar. 6, 2007:

U.S. patent application Ser. No. 11/682,693, entitled Methods and Systems For Selecting and Presenting Content Based On Learned Periodicity Of User Content Selection, now U.S. Pat. No. 7,774,294;

U.S. patent application Ser. No. 11/682,700, entitled Methods and Systems For Selecting and Presenting Content Based On Dynamically Identing Microgenres Associated With The Content, now U.S. Pat. No. 7,774,341;

U.S. patent application Ser. No. 11/682,689, entitled Methods and Systems For Selecting and Presenting Content Based On Activity Level Spikes Associated With The Content, now U.S. Pat. No. 7,657,526;

U.S. patent application Ser. No. 11/682,695, entitled Methods and Systems For Selecting and Presenting Content Based On User Preference Information Extracted From An Aggregate Preference Signature, now U.S. Pat. No. 7,739,280;

U.S. patent application Ser. No. 11/682,533, entitled Methods and Systems For Selecting and Presenting Content Based On A Comparison Of Preference Signatures From Multiple Users, now U.S. Pat. No. 8,380,726;

U.S. patent application Ser. No. 11/682,596, entitled Methods and Systems For Segmenting Relative User Preferences Into Fine-Grain and Coarse-Grain Collections, now U.S. Pat. No. 7,529,741; and U.S. patent application Ser. No. 11/682,599, entitled Methods and Systems For Selecting and Presenting Content Based On Context Sensitive User Preferences, now U.S. Pat. No. 7,792,815.

BACKGROUND OF THE INVENTION

1. Field of Invention

This invention generally relates to learning user preferences and, more specifically, to using those preferences to personalize the user's interaction with various service providers and interactions with content query systems, e.g., to better find results to queries provided by the user and to ordering the results for presentation to the user.

2. Description of Related Art

Personalization strategies to improve user experience can be chronologically classified into two categories: (1) collaborative filtering and (2) content reordering. Each is summarized in turn.

Collaborative Filtering was used in the late 1990s to generate recommendations for users. The term collaborative filtering refers to clustering users with similar interests and offering recommendations to users in the cluster based on the habits of the other users. Two distinct filtering techniques—user based and item based—are used in filtering.

In U.S. Patent App. Pub. No. U.S. 2005/0240580, Zamir et al. describe a personalization approach for reordering search queries based on the user's preferences. The application describes a technique for learning the user's preferences and increasing the promotion level of a search result based on personalization. Zamir et al. create a user profile, which is a list of keywords and categories listing the user preferences. The profile is generated from multiple sources, such as (1) information provided by the user at the time the user registers a login, (2) information from queries that the user has submitted in the past, and (3) information from web pages the user has selected.

Some systems directed to reordering content in the context of television schedules define categories and sub-categories according to an accepted standard. User preferences are gathered using various models such as (1) user input, (2) stereotypical user models, and (3) unobtrusive observation of user viewing habits. In some implementations, these models operate in parallel and collect the user preference information.

In other systems, a set of fixed attributes is defined and all media content and all user preferences are classified using these attributes. A vector of attribute weights captures the media content and the user preferences. The systems then determine the vector product between the content vector and the user preferences vector. The system suggests content to users where the values of the vector products exceed a predetermined threshold.

BRIEF SUMMARY OF THE DISCLOSURE

The invention provides methods and systems for selecting and presenting content on a first system based on user preferences learned on a second system.

Under an aspect of the invention, a user-interface method of selecting and presenting a collection of content items of a first content system in which the presentation is ordered at least in part based on content preferences of the user learned from the user selecting content of a second content system includes receiving incremental input entered by the user for incrementally identifying desired content items of the second content system, wherein each content item has at least one associated descriptive term to describe the content item. The method also includes, in response to the incremental input entered by the user, presenting a subset of content items of the second content system and receiving selection actions of content items of the subset from the user. The method further includes analyzing the descriptive terms of the selected content items to learn the content preferences of the user for the content of the second content system and determining a relationship between the content items of the first content system and the content items of the second content system. The relationship defines which learned user content preferences are relevant to the content items of the first content system. The method includes, in response to receiving subsequent incremental input entered by the user for incrementally identifying desired content items of the first content system, selecting and ordering a collection of content items of the first content system based on the learned content preferences of the user determined to be relevant to the content items of the first content system.

Under another aspect of the invention, the relationship between the content items of the first content system and the content items of the second content system is determined prior to at least one of receiving selection actions from the user and receiving subsequent incremental input entered by the user.

Under a further aspect of the invention, subsequent incremental input entered by the user is the first interaction between the user and the first content system. Under yet another aspect of the invention, the first content system has not characterized the content preferences of the user.

Under an aspect of the invention, the method also includes recording information associated with at least one of the selection actions from the user and including the information in the collection of content items.

Under a yet further aspect of the invention, the first content system and second content system are different systems. The first content system can be on a server system remote from the user and the second content system can be on a user client device. The second content system can be on a server system remote from the user and the first content system can be on a user client device.

Under an aspect of the invention, a user-interface method of selecting and presenting to a first user a collection of content items of a first content system in which the presentation is ordered at least in part based on content preferences of a second user learned from the second user selecting content of a second content system includes receiving incremental input entered by the second user for incrementally identifying desired content items of the second content system, wherein each content item has at least one associated descriptive term to describe the content item. The method also includes, in response to the incremental input entered by the second user, presenting a subset of content items of the second content system and receiving selection actions of content items of the subset from the second user. The method further includes analyzing the descriptive terms of the selected content items to learn the content preferences of the second user for the content of the second content system. The method includes determining a relationship between the content items of the first content system and the content items of the second content system. The relationship defines which learned user content preferences are relevant to the content items of the first content system. The method further includes, in response to receiving subsequent incremental input entered by the first user for incrementally identifying desired content items of the first content system, selecting and ordering a collection of content items of the first content system based on the learned content preferences of the second user determined to be relevant to the content items of the first content system.

Under another aspect of the invention, the relationship between the content items of the first content system and the content items of the second content system is determined prior to at least one of receiving selection actions from the user and receiving subsequent incremental input entered by the user.

Under a further aspect of the invention, subsequent incremental input entered by the first user is the first interaction between the first user and the first content system.

Under a yet further aspect of the invention, the first content system and second content system are the same systems.

Under yet another aspect of the invention, the selecting and ordering the collection of content items is further based on popularity values associated with the content items. Each popularity value indicates a relative measure of a likelihood that the corresponding content item is desired by the user.

Under a further aspect of the invention, the set of content items includes at least one of television program items, movie items, audio/video media items, music items, contact information items, personal schedule items, web content items, and purchasable product items. The descriptive terms can include at least one of title, cast, director, content description, and keywords associated with the content.

Under yet a further aspect of the invention, the set of content items is contained on at least one of a cable television system, a video-on-demand system, an IPTV system, and a personal video recorder.

These and other features will become readily apparent from the following detailed description wherein embodiments of the invention are shown and described by way of illustration.

BRIEF DESCRIPTION OF THE SEVERAL VIEWS OF THE DRAWINGS

For a more complete understanding of various embodiments of the present invention, reference is now made to the following descriptions taken in connection with the accompanying drawings in which.

DETAILED DESCRIPTION

Figure 1:
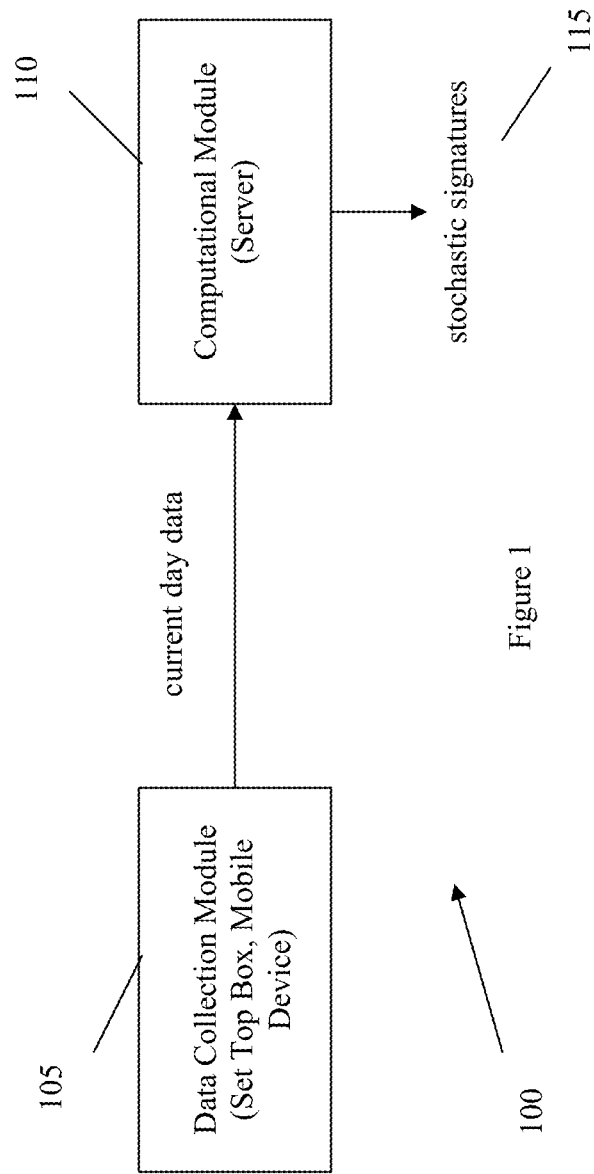
FIG. 1 illustrates two modules of a leaning engine.

Preferred embodiments of the invention capture user preferences for a single user or a family of users based on historical observations of the users' activities and by use of a statistical learning model (also referred to as a learning engine). In an illustrative embodiment, the users of the family are members of a household using a single interface device. The learning model identifies a signature, or set of signatures, for the entire household as a stochastic signature. This stochastic signature is used to predict future activities in which members of the family may engage. For the sake of simplicity, the description will refer to signatures and activities of a single user, when in fact, the same applies to a group of users using a single interface device.

One benefit of the learning engine is to enhance the user's experience by increasing the accuracy of the results of a user's query for content and organizing these results so as to put the most likely desired content items at the top of the results list. This increases the user's speed and efficiency in accessing the content he or she desires. In addition, the signatures can be used to identify clusters of users with similar interests for use with collaborative filtering techniques. The learning system can be one aspect of an overall system that provides content and selectable actions to the user, or the learning system can be a standalone system that monitors the user's actions across multiple systems and provides learned user preferences to external systems based on the context of the user's interaction with a particular external system.

Information Captured by Signatures

The stochastic signature is a probabilistic model, and it is an identity that can be used for validation, prediction, etc. While this type of signature can be used to identify a user according to his or her preference, it is distinguished from a unique signature that a user may employ to authenticate an item or guarantee the source of the item, for example. A stochastic signature may be created based on various types of activities, for example, watching television programs, dialing telephone numbers, listening to music, etc. Thus, embodiments of the invention are useful in a wide variety of contexts. In applications where there are multiple dataspaces to be searched, the system will use a collection of stochastic signatures related to that dataspace. For example, when searching a personal address book, calendar, or air-line schedules, the system can use the set of signatures related to that particular dataspace. In addition, the system can also learn correlated activities across dataspaces. This allows the system to learn how the user interacts with related dataspaces and use that learned behavior to personalize the presentation of content to the user. However, for the sake of simplicity, certain embodiments of the invention will be described with reference to a single dataspace interface, e.g., a television system interface.

In the context of a user device with limited input capability, for example, a television remote control, the stochastic signature is particularly useful because it can be difficult and/or time consuming to enter queries on such a limited input device. The stochastic signature increases the likelihood that the desired search results will be found based on limited query input. For example, if a particular household has generally watched a certain program at a given time in the past, stochastic signatures can be used to predict that the household will watch the program at the given time in the future. Thus, instead of requiring a member of the household to enter the title of the program, the learning system can predict that the member wishes to watch the program based on only a few button presses.

Embodiments of the present invention build on techniques, systems and methods disclosed in earlier filed applications, including but not limited to U.S. patent application Ser. No. 11/136,261, entitled Method and System For Performing Searches For Television Programming Using Reduced Text Input, filed on May 24, 2005, U.S. patent application Ser. No. 11/246,432, entitled Method And System For Incremental Search With Reduced Text Entry Where The Relevance Of Results Is A Dynamically Computed Function of User Input Search String Character Count, filed on Oct. 7, 2005, and U.S. patent application Ser. No. 11/235,928, entitled Method and System For Processing Ambiguous, Multiterm Search Queries, filed on Sep. 27, 2005, the contents of which are hereby incorporated by reference. Those applications taught specific ways to perform incremental searches using ambiguous text input and method of ordering the search results. The present techniques, however, are not limited to systems and methods disclosed in the incorporated patent applications. Thus, while reference to such systems and applications may be helpful, it is not believed necessary to understand the present embodiments or inventions.

FIG. 1 shows the architecture of an illustrative learning engine 100. There are two distinct modules to learning engine 100—a data collection module 105 and a signature computation module 110. Data collection module 105 monitors the user activity for channel tuning, DVR recording, etc. and captures the relevant statistics of the activity, for example, the duration a TV channel was watched, as well as the genres and microgenres (discussed below) of the program that was watched. In the case of a mobile device, additional information is collected, such as the type of dataspace being visited (e.g., phone book, calendar, and downloadable media content), geographic location of the mobile device, etc. Data collection module 105 can reside in a client device, where it gathers data about the users' activities and sends this data to signature computation module 110. In the alternative, data collection module 105 can reside on a remote server that serves content to the client device. In this case, the remote server collects data about the content requested by the users and passes this data to computation module 110.

As mentioned, the learning engine gathers information about channels, genres, and microgenres that the user has watched. Herein, the term "channel" refers to a tunable entity in a television system. A channel can be identified by its name (CBS, ABC, CNBC, etc.).

The term "genre" refers to the overall theme of an item. In some systems, every retrievable item is categorized into a genre. The collection of genres is system-definable, and can be as coarse or as fine-grained as necessary. In addition, the genres can be defined independent of the retrievable items and can be defined ahead of populating a content system with retrievable items. In one implementation, a function g(x) returns a subset of the set of genres for a given item. Thus, g(x) is a function with a domain space of a set of retrievable items and the range space of a set of all subsets of genres. This is so because any retrievable item may belong to more than one genre, e.g., a movie Sleepless in Seattle has a genre of movie and romance.

The term "microgenre" refers to a very refined, unambiguous theme of descriptor for a given item. For example, New England Patriots as a search item has a microgenre of NFL Football and genres of football and sports. As with genres, a search item can have multiple microgenres. While genres are "macro" themes, microgenres are "micro", unambiguous themes; these themes come from descriptive terms and metadata within the search items. Thus, the microgenres for New England Patriots also include Tom Brady. Microgenres are not limited to a set of predetermined descriptors, as are genres in the prior art, but can be any word that describes the item. Whether a particular theme is a genre or microgenre depends on the particular item with which the theme is associated and the configuration of the content system. Thus, microgenres are dynamic and generated "on-the-fly", while genres are static and system defined.

In dataspaces other than the television content space, the channel, genre, and microgenre approach to characterizing items is modified to reflect the attributes of the content items in that particular dataspace. Thus, for a telephone directory dataspace, the channel statistics are replaced with statistics related to the person or entity called. The genre statistics are replaced by statistics related to the type of entity called, for example, individual or business. While the microgenre statistics are replaced by statistics related to key secondary attributes of the item, such as home, office, and mobile telephone numbers as well as, for example, telephone numbers of persons related to the persons called.

Computational module 110 is sent the current day's data periodically and determines the users' signatures. In so doing, computational module 110 combines this current data with historical data using exponential smoothing or other smoothing techniques (discussed below) so that the signatures adapt over time to the users' changing preferences. Computational module 110 also performs other computations involving the signatures, for example, combining the individual signatures to obtain aggregate signatures that predict the viewing preferences of a large collection of individuals or creating signatures that capture the average activity level associated with a particular program (described in greater detail below). In one embodiment of the system, computational module 110 resides in one or more servers, to exploit the computational power of larger processors. However, in some implementations, e.g., where privacy is an issue, computational module 110 may reside in the client device.

A particular stochastic signature is a normalized vector of probabilities. The probabilities capture the historical patterns of the user's behavior with respect to a particular set of activities. An example of a signature for use with a television system is {(ABC 0.3), (CBS 0.2), (NBC 0.5)}. This signature captures that over a given time period, when the user was watching television, the user watched ABC 30% of the time, CBS 20% of the time, and NBC 50% of the time. The stochastic nature of the signature says that this is a historical average and not an exact number.

Because the system captures the user's behavior and preferences across multiple dataspaces, taking into account the geographic location of the user, or the user's client device, the multiple signatures can be represented as a set with three indices. Thus, the convention signature (t, g, s) represents a signature in geographic location g at time t for dataspace s. This allows the system to use difference subspace projections to utilize the information contained in the entire set. For example, the system may utilize the user's preferences based on activity across all geographic locations or based on a composite of multiple times for a given dataspace and given location. The composite signature is described in greater detail below.

Although time is obviously a continuous variable, for the purpose of learning the user's preferences and activities, a coarse, or discretized, view of time is used to capture all activity. Thus, the system divides time into discrete quantities and represents time as an integer from one to the number of discrete quantities in a day. For example, time can be divided into the number of minutes in a day, thereby representing time as a number 1 to 1440. In addition, this discrete representation of time can be further subdivided into time slots that encompass multiple minutes, as discussed below. The duration, and therefore the number, of time slots is selected based on the nature of the activity of the particular dataspace. For example, in the television dataspace it is appropriate to divide time into 30-minute time slots to correspond to the program boundaries. In other dataspaces, the coarseness can vary. Although it is not necessary to have the same time division in all dataspaces, the examples set forth below assume identical time slot durations for the sake of simplicity. Similarly, geographic location, though continuous, is discretized and represented by character strings. For example, the geographic location identifiers can be a postal code, a major metropolitan area, or an area of a given size with the latitude and longitude of its center being the location identifier.

Figure 2:
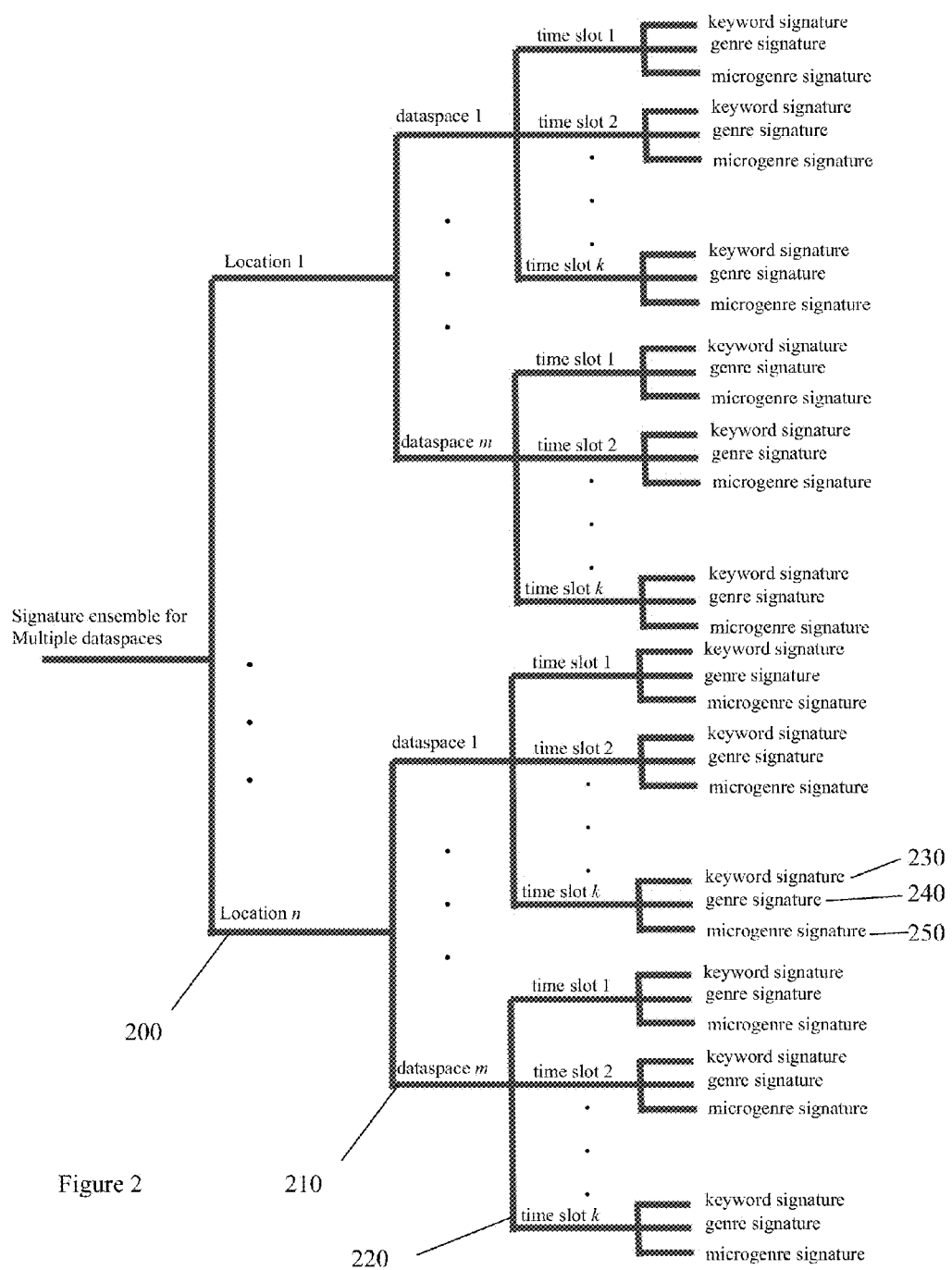
FIG. 2 illustrates a collections of signatures of a user.

There are many possible collections of signatures that capture the activities of the user or family of users at various levels of granularity. FIG. 2 shows a sample signature hierarchy for the multiple dataspace learning model, with n locations 200, m dataspaces 210, and k time slots 220. At the first level, the figure illustrates activities in each location 200. Within each location 200, the system captures dataspace-specific activities in individual signatures. Inside each dataspace 210, for each time slot 220, the system obtains a unique signature. Finally, the signature hierarchy captures the nature of the activity within the time slot by appropriate keyword 230, genre 240, and microgenre signatures 250 (or equivalent statistics depending on the dataspace, as described above). The illustrative learning system shown in the figure has 3nmk signatures in the collection.

The timeslots shown in FIG. 2 can be further divided according to the particular needs of the learning system. Thus, a top-level time slot can have lower level time slots organized beneath the top-level time slot. For example, a top-level time slot can be a day organized into lower-level time slots of an hour or half-hour increments, each having its own collection of signatures. Similarly, the day time slot can have a collection of composite signatures beneath it that aggregate all of the information of the individual time slots for that given day into a single composite signature.

Figure 3:
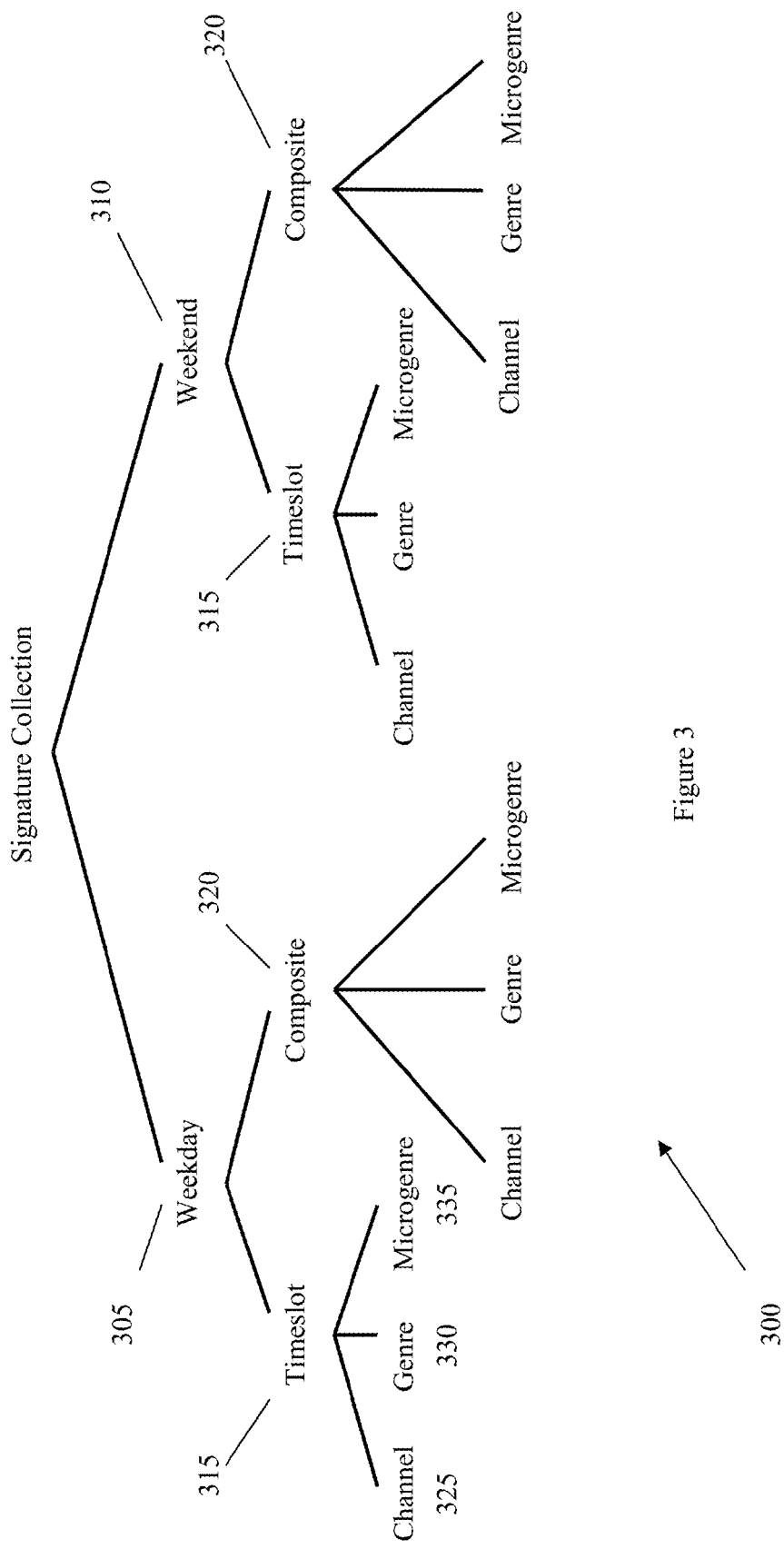
FIG. 3 illustrates a collection of signatures of a user for a single dataspace in a single location.

FIG. 3 shows an illustrative example of the organization of a signature collection 300 for the user in the television program dataspace at a single location. At the top level, the signatures are classified into various periodicities for the user, as discussed in greater detail below. The example in FIG. 3 shows a weekday periodicity 305 and a weekend periodicity 310. Within each periodicity, signature collection 300 is further divided into individual time slots 315 with a composite 320 for each day. Within each further division exists three types of signatures: channel 325, genre 330, and microgenre 335. Thus, there is one of each of these three types of signatures for every weekday time slot, weekend time slot, and one for each weekday composite and weekend composite. Therefore, the system captures the activities performed by the user in this single dataspace and at this single location as defined by the hierarchy present in signature collection 300.

Because activities vary widely in a multiple dataspace environment, the system can capture the user's activities, according to the signature hierarchy, as duration and/or count. In other words, the system can track the amount of time the user spent performing an activity, or the system can track the number of times the user preformed a particular activity, or the system can record both. For example, if the system is modeling a DVR recording activity or DVD ordering activity, there is no duration measure associated with it. Thus, in these cases, the system will capture the intensity of the activities by the count (frequencies) of the activities. However, other activities have duration as a natural measure of the intensity of the activities (e.g., watching a television program). While still other activities have both count and duration as a natural measure of intensity (e.g., placing a telephone call and conducting the call). To be inclusive of all activities, the system models every activity by both count and duration. Thus, there are two signatures for each keyword, genre, and microgenre division of the hierarchy. Likewise, there are two for each composite as well. For each time, location, and dataspace, a function $f$ defines the convolution of the two intensity measures into a single signature:

$$f_{tgs}:(count,duration) \to single\ measure \qquad \text{(Equation 1)}$$

For the sake of simplicity, this description omits the adjective, count or duration, in referring to signatures, opting for disambiguation based on the context.

In one embodiment of the invention, signatures capture the television viewing activity of the family of users in a single geographic location, and these signatures are used to identify and organize television program search results. The learning engine divides a day into time slots. For the purposes of this example, there are 48 time slots in a 24-hour day. Thus, one time slot corresponds to the smallest length TV-program, i.e., 30 minutes. In other implementations, time slots may be larger or smaller, for example, in a system using stochastic signatures to identify a user's telephone calling preferences, the time slots may be two to three hours long. During each time slot, the user activity is recorded and the learning system creates a time slot signature for each time slot. In addition, at the end of each day, the learning system creates a composite signature based on the data collected across all time slots within the current day. The signature is said to be composite in that it represents a user's activity across multiple time slots. As discussed in greater detail below, the learning system uses smoothing techniques to create evolving signatures that retain activities in the distant past as well as the most recent activities.

The day is divided into time slots because each family of users has a recurring viewing behavior based on the time of day. Thus, the learning system learns television-viewing preferences from the past behavior during a given time slot. Any queries for television content that originate in that time slot on a later day can use these preferences to identify and organize content by using that time slot's signature.

For example, in an illustrative family of three—husband, wife, and a child—mornings and afternoons are taken up by soap operas and talk shows; afternoons are taken up by cartoons and children's programming; and evenings are taken up by business, movies, and prime time shows. During these periods, it is likely that queries for current television content also relate to the corresponding past viewing behavior. Thus, signatures that capture this past behavior are used to identify and organize content consistent with this past behavior. However, for more aggregate behavior, independent of time slots, it is desirable to have a coarse grain view of the day's activity in the household. The time slot activity is aggregated into a day's activity; this is the basis of the composite signature. Thus, at the end of each day, the system has collected and aggregated 49 different signatures, 48 individual time slot signatures and one composite signature.

Composite signatures serve two purposes. First, if the family of users has a slight time-drift in their behavior (e.g., some days a particular user watches a given program at 10:00 AM, while other days at 10:45 AM), the time slot signatures may get shifted by one slot. However, the composite will still capture the overall viewing behavior correctly. Second, a particular user may time-shift deliberately by many time slots. The composite signatures will also correctly capture this behavior.

User Periodicity

The above example implicitly assumes that the user has a recurring behavior with a periodicity of a day. However, the learning system may utilize other periodicities, as explained below. As mentioned above, one benefit of the learning system is to enhance the user's experience by increasing the accuracy of the results of a user's query for content and organizing these results so as to put the most likely desired content items at the top of the results list. This increases the user's speed and efficiency in accessing the content he or she desires.

Towards this end, the learning system infers periodicity of activities. For example, as discussed above, there is a daily periodicity of activities. However, the daily periodicity model may not always apply, as occurs during a weekend, during which time the users' activities can be quite different from those during the week. To capture this different behavior pattern, for example, the system will utilize two different periodicities. Thus the weekday periodicity will contain data for the days during the week, while the weekend periodicity will be empty for those days and vice versa. This is an example of orthogonal periodicity.

The term orthogonal refers to the fact that the periodicity waveforms are orthogonal; i.e., if $f(x)$ is a periodicity function and $g(x)$ is another periodicity function, then $f(x)$ and $g(x)$ have orthogonal periodicity if $$f(x)g(x)=0;\ 0 \leq x \leq \infty \qquad \text{(Equation 2)}$$

Figure 4:
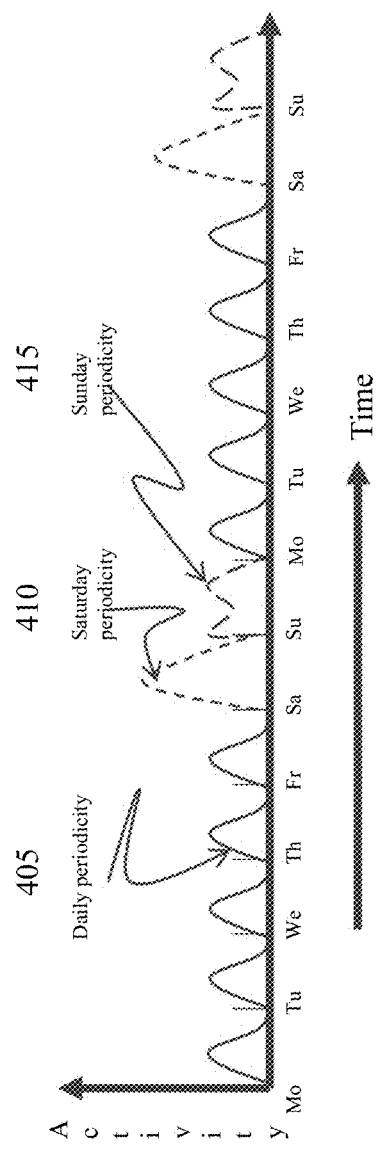
FIG. 4 illustrates orthogonal periodicities.

Equation 2 defines strong orthogonality, or pointwise-orthogonality, in contrast with the strict mathematical definition of orthogonality of functions (see F. B. Hildebrand, *Introduction to Numerical Analysis*, second edition, McGraw-Hill Book Company, New York, 1974, hereby incorporated by reference). FIG. 4 illustrates an example of orthogonal periodicity. The figure shows a variety of waveforms that represent the activity captured by a set of signatures for a particular dataspace in a particular location. The Y-axis is the intensity of activity during a particular day, and X-axis is the day. A weekday waveform 405 captures the activity during the days of the week (i.e., Monday-Friday). Whereas a Saturday waveform 410 and a Sunday waveform 415 capture the activity on Saturday and Sunday, respectively. A solid line shows weekday periodicity waveform 405; a short dashed line shows the Saturday periodicity waveform 410; and a long dashed line show Sunday periodicity waveform 415.

FIG. 4 illustrates the waveforms are orthogonal in that the activity level for weekday waveforms is zero during Saturday and Sunday, while the Saturday waveform is zero for all non-Saturday days, and the Sunday waveform is zero for all non-Sunday days. The system captures these orthogonal periodicities by storing the activities in distinct sets of signatures, with one set of signatures for each orthogonal period. As explained above, the set can include both individual time slot signatures as well as a composite signature for the entire orthogonal period. When a user query is submitted within a particular period, the corresponding set of signatures is used in identifying and organizing the search results.

Although the above example is in terms of a week, periodicity can extend beyond a week. For example, periodicities can exist within a day or can extend beyond a week. In addition, some periodicities may not be orthogonal. Thus, the system uses a second kind of periodicity, namely overlapping periodicity, to capture this phenomenon.

Figure 5:
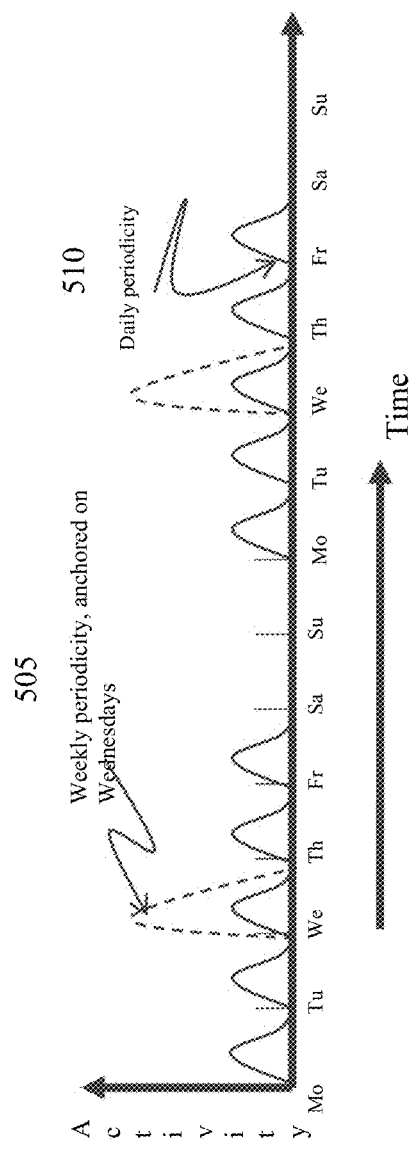
FIG. 5 illustrates overlapping periodicities.

In overlapping periodicities, the periods overlap; i.e., the same time and day can belong to multiple periods, one having a larger frequency than the other. Thus, the strong orthogonality property of Equation 2 does not apply to overlapping periodicities. FIG. 5 shows an example of overlapping periodicity. In this example, a user watches a recurring program every Wednesday, along with the usual daily programs that she watches. Thus, there is a weekly period 505 with a frequency of once per week and a daily period 510 with a frequency of once per day.

Overlapping periodicities are distinguished by storing the same activities in multiple sets of signatures, one set for each overlapping periodicity. In the example of FIG. 5, the system will store the same Wednesday activity both in daily set 510 and weekly set 505. Notice that weekly set 505 does not contain activities from other days. When a query is submitted on a Wednesday, a union of both signatures is used in identifying and organizing the content results. Both signatures are combined in such as way as to reflect the fact that the weekly signature 505, anchored on Wednesdays, has a greater impact on the query results than does daily signature 510.

As mentioned above, the learning system defines periodicities according to the users' behavior. In one illustrative implementation, the system compares each recorded user action and determines the periodicity of similar actions by measuring the time that elapses between the similar actions. The similarity can be based on, for example, the user watching the same television channel or the user watching television programs of the same genre or microgenre. Therefore, if a user watches a particular television show on the first Tuesday of every month, the system would capture this as a monthly periodicity. Thus, although the system can use predefined periodicities, the system creates periodicities of any time duration as needed by the particular usage case. As mentioned above, capturing the user's viewing preferences in the television dataspace is only one example of an implementation of the learning system. Other examples include learning the user's dialing preferences in the telephone dataspace or tracking the user's buying behavior in the internet dataspace.

Signatures as Multiple Vectors

As explained above, vectors can be used to capture the family of users' behavior. A vector is defined as a linear array of numbers. Every vector belongs to a vector space. In one embodiment of the learning system, the system only operates in vector spaces in $R^{+n}$, defined as $$R^{+n} = \{(x_1, x_2, \ldots, x_n) | x_i \geq 0 \text{ all } i\} \quad \text{(Equation 3)}$$

Figure 6:
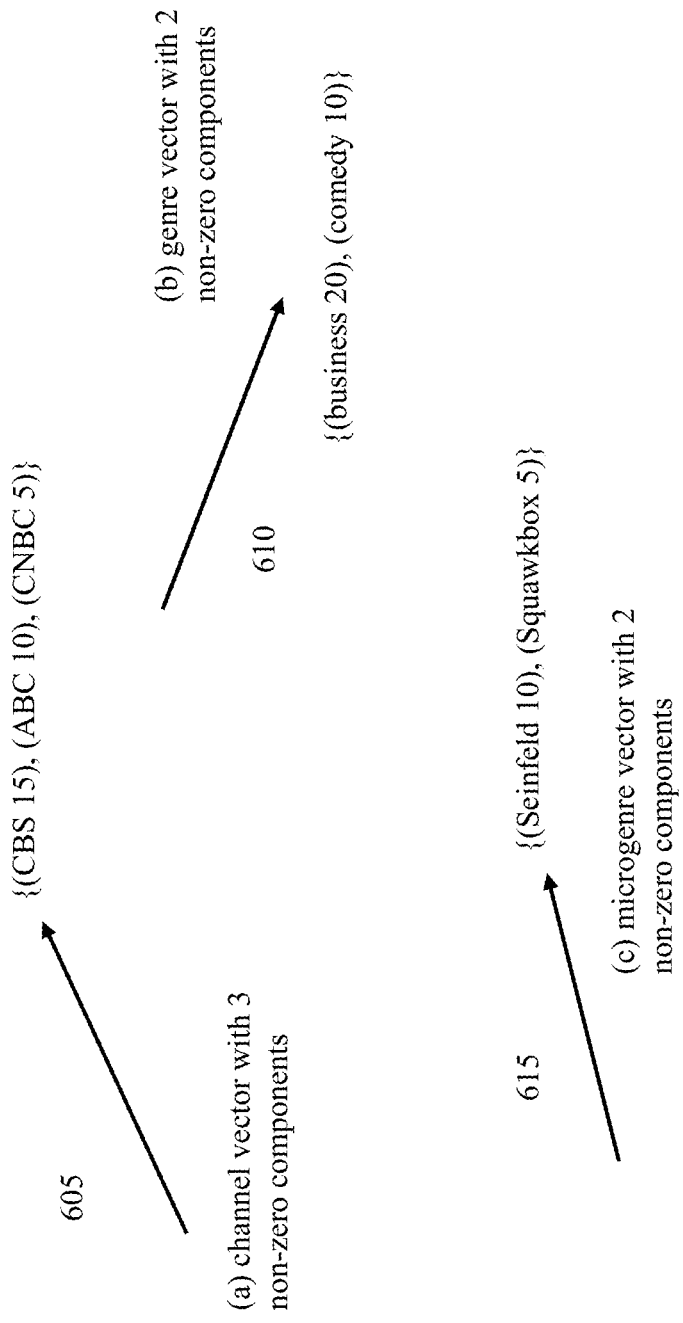
FIG. 6 illustrates sample vectors in three vector spaces.

The dimensionality of the vector space depends on the type of vector. For example, the dimensionality of a channel vector space is the number of channels in the television system. The values in the vector also depend on the type of vector; e.g., it can be duration or count or any other metric deemed appropriate to capture the activity of the family of users. FIG. 6 shows an example of a collection of vectors capturing the users' activity between 10:00 AM and 10:30 AM on a weekday.

The vectors in FIG. 6 correspond to three different vector spaces—channel, genre, and microgenre. The dimensions of these vector spaces are the number of channels in the TV system, the number of genres defined in the learning system, and the number of microgenres dynamically created in the learning system, respectively. Only nonzero values are stored in the various vectors. All other values are implicitly zero and are not stored in the system. Thus, the learning system fundamentally stores all vectors as sparse vectors. The technology of sparse vectors and sparse matrix computations eases the burden of working with large vector spaces (see I. S. Duff, A. M. Erisman, and J. K. Reid, *Direct Methods for Sparse Matrices*, Monographs on Numerical Analysis, Oxford Science Publications, Clarendon Press, Oxford, 1986, for a description of numerical computations using sparse matrices and sparse vectors, hereby incorporated by reference).

A channel vector 605 in the figure has nonzero values for channels CBS, ABC, and CNBC. The values correspond to the number of minutes the user watched each channel between 10:00 AM and 10:30 AM. Similarly, the program genres are captured in a genre vector 610. In this example, the CBS and CNBC channels were broadcasting programs of type business and ABC was broadcasting a program of type comedy. Finally the program microgenres are captured in a microgenre vector 615. In the above example, ABC was broadcasting the comedy show Seinfeld, CNBC was broadcasting a business show Squawkbox, and no microgenre was created for the CBS show.

As previously mentioned, the techniques described above can be implemented in data collection modules and signature computation modules that reside on either a client device or a remote server system. Thus, the channel, genre, and microgenre data can be gathered and processed locally by the client device, or this information can be sent to a remote server system for processing. Likewise, the signatures can reside on a client device or on a remote server system for use as described below.

In addition to capturing the user's activities according to keyword (i.e., channel in the television dataspace context), genre, and microgenre, the system also learns the amount of time the user spends in each dataspace independent of location and time slot. This gives rise to yet another signature: the dataspace fraction signature. The dataspace fraction signature (herein "dfs") has the coordinates of time and location and is represented by dfs(t, g). The signature dfs(t, g) is a normalized probability vector indicating the fraction of time (and/or activity count) the user spent in various dataspaces. For example, dfs(t, g)[s] contains the value indicating the fraction of time and/or count spent in dataspace s, at time t in location g. This two-coordinate signature is used to reorder the search results space when a search across dataspaces is performed. Meanwhile, as described above, a three-coordinate signature is used to reorder the items within each dataspace, e.g., ks(t, g, s) denotes a keyword signature in time slot t, in location g, and in dataspace s; ks(t, g, s)[x] denotes the value of element x in the keyword signature. Therefore, when the user initiates a search across all dataspaces, the system will reorder content items from the multiple dataspaces according to the user's dataspace preferences based on the information contained in the dataspace fraction signature. If the user performs actions in one particular dataspace relative to another, the result from the more heavily used dataspace would be promoted over the results from the lesser-used dataspace.

The following example is provided to illustrate this aspect of the learning system. A mobile user visited the telephone dataspace 30 times, the television dataspace 20 times, and the web dataspace 10 times while located in Denver during the 10 AM time slot. During these interactions with the system, the user called Sam, Sally, and Stewart, speaking for 5, 15 and 10 minutes respectively. The user watched a television program entitled "Seinfeld" for 30 minutes. In addition, the user browsed the Google webpage for 10 minutes and Yahoo! webpage for 20 minutes, respectively. Using a count measure for the dataspace fraction signature and a duration measures for the television, telephone, and web dataspaces, the keyword signature and dataspace fraction signature ensemble, will be as follows:

dfs(10, "Denver")["phone-space"]=0.5
dfs(10, "Denver)["TV-space"]=0.33
dfs(10, "Denver")["web-space"]=0.17
ks(10, "Denver", "phone-space")["Sam"]=0.17
ks(10, "Denver", "phone-space")["Sally"]=0.50
ks(10, "Denver", "phone-space")["Stewart"]=0.33
ks(10, "Denver", "TV-space")["Seinfeld"]=1.0
ks(10, "Denver", "web-space")["Google"]=0.33
ks(10, "Denver", "web-space")["Yahoo!"]=0.67

Thus, if the user enters a text query starting with the letter "S", all results beginning with the letter "S" would be presented to the user. However, the matching results from the phone-space would be promoted over the results from the TV-space and the web-space because the dataspace fraction signature probability for the phone-space is the greatest. This is so even though the probability for the lone TV-space item is greater than any of the phone-space items. Within the phone-space, the individual items would be sorted according to the keyword signature probability values. Therefore, the entry for "Sally" would be promoted over the other phone-space items. This example clearly shows the Bayesian property of the signatures. That is, the probabilities add up to one, conditioned on the fact that the user is in a particular dataspace (see B. W. Lindgren, G. W. McElrath, D. A. Berry, *Introduction to Probability and Statistics*, Macmillan publishing co., New York, 1978, herein incorporated by reference, for more details on Bayes's theorem).

As described above, the signatures associated with a particular dataspace (i.e., keyword, genre, and microgenre signatures) capture the probability of the user performing a future action or desiring a future content item based on past activities and selections that took place within that particular dataspace. Thus, the individual dataspace signatures are conditional signatures in that the probabilities they measure are conditioned upon the user operating in the particular dataspace to which those signatures relate.

The dataspace fraction signature probabilities can be used to weight the individual dataspace signature probabilities to provide a measure of the probability of a user performing a given action outside of a particular dataspace. This operation gives rise to an unconditional signature. The unconditional signature measures the probability of the user performing an action outside of any particular dataspace based on the information contained in the individual dataspace signatures and the information contained in the dataspace fraction signatures. The system uses Equation 4, below, to determine the unconditional keyword signature for an activity "A". Unconditional signatures for genre and microgenre can be determined in the same way.

$$uks(t,g,s)[A]=ks(t,g,s)[A]*dfs(t,g)[s] \quad \text{(Equation 4)}$$

The learning system can organize the various dataspaces, content, and selectable actions into a tree hierarchy, which the user can navigate using the client device. The unconditional signatures are used by the learning system to rearrange the various branches of the tree structure so as to present the most favored content to the user based on the probabilities stored in the signatures. In addition, the unconditional probabilities enable the system to present lists of commingled selectable actions and content items based on the most commonly performed actions and most commonly exhibited preferences. For example, the learning system is capable of creating a "My Favorites" list based on the various signatures, or the system could rearrange a content tree hierarchy in order to reduce the effort required of the user to reach certain preferred content.

Correlated Activity Signatures

The learning system is also capable of learning correlated activities across dataspaces. A correlated activity is an activity performed in a secondary dataspace while starting from a primary dataspace. In general, by capturing correlated activities across dataspaces, the system is learning not only standalone actions and content preferences, but the system is learning chains of actions performed by the user. For example, a user enters the telephone dataspace of his device to make a telephone call. During the telephone call, the user wishes to enter the calendar dataspace to search for and review the date and time of a particular appointment. In this example, the user remains engaged with the primary dataspace, the telephone dataspace, for the duration of the telephone call. The user also performs a correlated action, the act of searching for an appointment, in the secondary dataspace, which is the calendar dataspace.

The purpose of learning the correlated activities is to achieve better ordering of the search query results in the secondary dataspace based on the correlated activities learned by the system. Thus, the correlated activity signatures provide yet another way to learn the preferences of the user and how the user interacts with his or her client device. This additional set of preferences and learned actions further enhances the user experience.

In general, the system has an activity matrix A that is a square N by N matrix, where N is the number of dataspaces. Each entry in the matrix is a signature vector that captures the actions performed in the secondary dataspace while operating from the primary dataspace. Thus, A is in fact a three dimensional matrix, which can be defined as follows:

$A(i,i)[x]:=0; 1 \leq i \leq N$, for all items $x \in$ dataspace $i$ $A(i,j)[x]:=$average number of accesses of item $x$ in dataspace $j$ while in dataspace $i$; $1 \leq i \leq N$; $1 \leq j \leq N$; $i \neq j$; for all items $x \in$ dataspace $j$ \quad (Equation 5)

The matrix determined by Equation 5 captures the correlated activities of the user, and therefore can be used in accordance with the techniques disclosed herein to predict the probability that the user would perform an action in a secondary dataspace while operating from a primary dataspace. In addition, the correlated activity signatures can be used to determine the unconditional probability of the user accessing a keyword item x in dataspace s, location g, and at time t. The probability determination depends in part on the mode of access utilized by the user. As described in Equation 6 below, if the user is entering dataspace s at the root level of the client device (i.e., the user is not currently in a dataspace), the probability determination is based on the dataspace fraction signature and the relevant signatures for the selected dataspace (e.g., the keyword signature, the genre signature, or the microgenre signature). If the user is entering dataspace s from another dataspace, the probability determination is based on the dataspace fraction signature and the correlated activity matrix A.

$$Prob[x] = \begin{cases} dfs(t,g)[s]*ks(t,g,s)[x]; & s \text{ is visited at root level} \\ \sum_{1 \leq i \leq N} A(i,s)[x]*dfs(t,g)[i]; & \text{otherwise} \end{cases} \quad \text{(Equation 6)}$$

For the sake of simplicity, the learning system's ability to capture correlated activities was described in terms of a primary and secondary dataspace only. However, the invention is not limited to correlations between only two dataspaces. The learning system can also capture user activities and preferences when the user enters a first dataspace, enters and performs an action in a second dataspace, and enters and performs yet further actions in a third dataspace. In fact, using the principles and techniques described above, the learning system can create N! number of correlation signatures.

Signature Clustering

As described above, the users' activity and preferences are stored as vectors. Capturing the users' activity and preferences as vectors has many benefits. Among these is the fact that because signatures are vectors, one can easily determine when two signatures are nearly identical. For example, let $\tilde{x}$ and $\tilde{y}$ be two signatures in the same vector space. Lower case letters in bold will generally denote normalized probability vectors in appropriate dimension. A tilde over the top of a vector will generally denote un-normalized vectors. Greek symbols and lower case letters, without bold, will generally denote scalars. If $$\text{vector angle}(\tilde{x}, \tilde{y}) = \frac{\tilde{x}^T \tilde{y}}{\|\tilde{x}\| \|\tilde{y}\|} \geq (1 - \varepsilon), \quad \text{(Equation 7)}$$

where $\epsilon$ is a small fraction in the vicinity of 0.01, then the two signatures are nearly identical. Equation 7 states that if the cosine of the angle between the two signatures is small enough, then they are nearly identical, up to a scaling factor. The scaling factor recognizes that two vectors may have different magnitudes, but still be overlapping. For example, a first user has a genre vector of {(sports 20); (world news 50)} and a second user has a genre vector of {(sports 60); (world news 150)} where the first value within the vector elements is the genre and the second value is minutes watched per day. Although the magnitudes of these two vectors are different, the genres and ratio of minutes of sports to world news is identical. Thus, the learning system identifies these two signatures as nearly identical. The learning system can exploit this aspect in a variety of ways, as described in greater detail below.

In one illustrative implementation, the system clusters signatures that are similar into subsets. The subsets can then be used for many purposes, such as promotions, targeted advertisements, etc. For example, if several users of a particular cluster have watched a certain television program, this television program will be recommended to other users of the cluster who have yet to view the program. Similarly, outside of the television context, if users of a particular cluster have purchased a given item, ads for this item are presented to the other users of the cluster who have not purchased the item.

The notion of viewing signatures as vectors can be exploited to determine the similarity between the signatures by using Equation 7. Each cluster represents nearly identical signatures. Initially, the procedure starts with singleton clusters, and recursively collapses them until no more merging is possible. An example of pseudo-code that generates clusters of signatures is provided below:

PROCEDURE
Inputs:
  1. N signatures $s_1, s_2, ..., s_N$
  2. Tolerance threshold $\epsilon$, $0 \leq \epsilon \leq 1.0$ -continued Outputs:
  1. Sets $\Psi_1, \Psi_2, ..., \Psi_c$ containing the signature clusters
BEGIN
  1. Initially define singleton sets $\Omega_j := \{s_j\}$; $1 \leq j \leq N$
  2. merged := FALSE
  3. for $1 \leq i \leq N - 1$ do
    a. if set $\Omega_i = \emptyset$, continue
    b. for $i+1 \leq j \leq N$ do
      i. if set $\Omega_j = \emptyset$, continue
      ii. If for every $x \in \Omega_i$ and every $y \in \Omega_j$
        vector_angle(x, y) $\geq (1 - \epsilon)$, then
        A. $\Omega_i := \Omega_i \cup \Omega_j$
        B $\Omega_j := \emptyset$
        C. merged := TRUE
      end_if
    end_for
  end_for
  4. if merged = TRUE, go to step 2.
  5. c := 0
  6. for $1 \leq i \leq N$ do
    a. if $\Omega_i \neq \emptyset$ then
      i. c := c + 1
      ii. $\Psi_c := \Omega_i$
    end_if
  end_for
END
END_PROCEDURE Signature Decomposition In addition, the learning system can decompose one or more signatures to approximate the number of family members in a signature, the gender of each family member, and the ages of the family members. The system uses a nonlinear optimization model to approximate these values. In this example, the learning system uses genre signatures; similar models apply to channel and microgenre signatures.

The technique starts with historical, human behavioral, statistical data on television viewing habits obtained from generally available data (such as the user viewing preferences available from the DVB Project, see www.dvb.org). In particular, $\Delta$ is a set of all genres that are available to the viewing public. Upper case Greek letters in bold font generally denotes sets. Thus, a collection of probability distributions exists, namely $f_g^y(t)$ Probability that a genre g would be watched by a person of gender y and age t; y={male, female};

$$0 \leq t \leq \infty; g \in \Delta \quad \text{(Equation 8)}$$

The learning system also provides a signature s that collectively describes the viewing habits of the household. The illustrative maximum likelihood estimation problem formulated below defines the most likely set of household members that may produce the signature s. For the purposes of this example, all vectors, normalized or unnormalized, are lower case bold letters.

The inputs to the optimization problem are the probability distribution functions $f_g^y(t)$ and a family signature s that collectively represents the activities of a household. The outputs are n, the number of members in the household, where $1 \leq n$, the age and gender of each family member i, where $1 \leq i \leq n$, and a set of signatures $s_1, s_2, ..., s_n$, where signature $s_i$ corresponds to family member i. Further, let $N=|\Delta|$, the cardinality of the Genre set, $\Phi$=set of all nonnegative basis matrices B for the vector space $R^{+N}$ (i.e., $B=[b_1, b_2, ..., b_N]$, where $b_i$ is a nonnegative N-vector and $b_i$, $1 \leq i \leq N$, are linearly independent, and for any vector $s \in R^{+N}$, $$s = \sum_{i=1}^{i=N} \alpha_i b_i,$$

with $\alpha_i \geq 0$).

The decision variables are as follows: basis matrix $B \in \Phi$, variables $x_1, x_2, \ldots, x_N$, which represent the ages of family members with signatures corresponding to the basis vectors in B, and variables $y_1, y_2, \ldots, y_N$, which represent the gender of the corresponding family members.

For the purpose of optimization, it is necessary to define an objective function to maximize. Towards this end, the system uses an intermediate function, as follows:

$$s = \sum_{i=1}^{i=N} \alpha_i b_i, \; \alpha_i \geq 0, \quad \text{(Equation 9)}$$

for any vector $s \in R^{+N}$ and any basis Matrix $B \in \Phi$ $$h(v, x, y) \overset{\Delta}{=} \prod_{1 \leq k \leq N} f_k^y(x) v^{(k)}, \quad \text{(Equation 10)}$$

where
$v^{(k)}$ is the $k^{th}$ component of vector $v$

Function $h(v, x, y)$ evaluates the likelihood probability of a person with age x and gender y having a signature v. Note that the system is taking the product of all the components of vector v. Thus, the maximum likelihood estimation becomes $$\underset{B \in \Phi}{\text{Maximize}} \sum_{1 \leq j \leq N} h(\alpha_j b_j x_j, y_j) \quad \text{(Equation 11)}$$

subject to the following constraints:

$$s = \sum_{i=1}^{i=N} \alpha_i b_i; \; \alpha_i \geq 0; \quad \text{(Equation 12)}$$

$$1 \leq x_j \leq \infty; 1 \leq j \leq N; \quad \text{(Equation 13)}$$

$$y_j = \{0, 1\}; 1 \leq j \leq N. \quad \text{(Equation 14)}$$

This optimization problem can be shown to be NP-Hard (see M. R. Garey, and D. S. Johnson, *Computers and Intractability A Guide to the theory of NP-completeness*, W.H. Freeman and Company, New York, 1979, herein incorporated by reference), since any technique needs to search over the space of all bases in $R^{+N}$ and the fact that the y variables are integer variable. This problem has some similarities to another non-standard class of optimization problems known in the literature as semi-definite programs. An approximate solution to this problem can be achieved using an illustrative technique described below.

The estimation technique uses a first approximation by converting these discrete variables to continuous variables with bounds. This makes the transformed problem amenable to differentiable optimization. The technique also uses a second approximation by identifying a subset of the set of all bases $\Phi$ as the set of bases in $R^{+N}$ that are permutations of the coordinate basis matrix and restricts the search to this set. Given any basis from this set, the inner iteration involves a steepest ascent technique in variables ($a_j$, $x_j$, and $z_j$) to obtain a local maximum (where $z_j$ is a continuous approximation of $y_j$). The iterations are terminated when no improvement in the objective function occurs. After termination, the gender variables that are fractional are rounded/truncated using a rounding heuristic, described below. Given a fixed basis matrix, the transformed maximum likelihood estimation problem becomes a continuous maximum likelihood estimation problem and is given by the following equations:

$$\text{Maximize} \sum_{1 \leq j \leq N} h(\alpha_j b_j, x_j, z_j) \quad \text{(Equation 15)}$$

subject to the following constraints:

$$s = \sum_{1 \leq j \leq N} \alpha_j b_j \quad \text{(Equation 16)}$$

$$1 \leq x_j \leq \infty \quad 1 \leq j \leq N \quad \text{(Equation 17)}$$

$$0 \leq z_j \leq 1 \quad 1 \leq j \leq N \quad \text{(Equation 18)}$$

$$\alpha_j \geq 0 \quad 1 \leq j \leq N \quad \text{(Equation 19)}$$

An example of pseudo code for solving the above continuous maximum likelihood estimation problem is given below. The pseudo code consists of an outer iteration and inner iteration. In the outer iteration, the code iterates through basis matrices. While in the inner iteration, the code employs the steepest-ascent optimization technique to obtain the optimal solution, given a basis matrix.

The steepest-ascent optimization technique has three steps. First, the optimization technique obtains the gradient of the objective function at the current iteration. This is done in step 2.c.ii, set forth below, using difference approximations. The technique of using difference approximations, as well as other numerical and matrix techniques can be found in D. G. Luenberger, *Linear and Nonlinear Programming, second edition*, Addison-Wesley publishing company, Reading Mass., 1989, herein incorporated by reference. Second, the optimization technique projects the gradient onto the null space of B, to obtain the ascent direction d (step 2.c.iii). Third, the optimization technique obtains the optimal step length along d (step 2.c.iv). In the field of optimization, this is called a step-length computation and involves a one-dimensional optimization. The inner iterations proceed until no more improvement in the objective function is possible. After this, the basis matrix is changed and the inner iterations are reinitiated. Finally, rounding heuristics (such as those in G. L. Nemhauser, and L. A. Wolsey, *Integer and Combinatorial Optimization*, John Wiley & sons New York, 1988, herein incorporated by reference) are employed to round off the fractional variables.

In the pseudo code set forth below, I is an identity matrix of order N, and $P_i$ is the $i^{th}$ permutation matrix in the sequence of permutations of the index set $\{1, 2, 3, \ldots, N\}$.

PROCEDURE
Inputs:
   1. The historical probabilities $f_k^y(x)$
   2. The family stochastic signature s
Outputs:
   1. Number of family members
   2. Sex of family members
   3. Age of family members -continued 4. Individual signatures of family members
BEGIN
  1. Initialize:
    a. Current basis matrix B := I
    b. Iteration counter i := 0
    c. Permutation matrix P := I
    d. newOuterObj := 0; oldOuterObj := −∞
    e. $\alpha_j := s_j\ 1 \leq j \leq N$
    f. $x_j := 1\ 1 \leq j \leq N$
    g. $z_j := 0\ 1 \leq j \leq N$
    h. stopping tolerance for inner iterations $\epsilon := 0.001$
    i. stopping tolerance for outer iteration $\beta := 0.0001$
  2. While ((newOuterObj − oldOuterObj) / |oldOuterObj| > β) Do
    //outer iteration
    a. oldOuterObj := newOuterObj
    b. Initialize inner iteration; newInnerObj := 0; oldInnerObj := −∞
    c. while ((newInnerObj − oldInnerObj) / |oldInnerObj| > ε) Do
      i. oldInnerObj := newInnerObj
      ii. Compute the gradient vector g := [∂h/∂$\alpha_j$], [∂h/∂$x_j$], [∂h/∂$z_j$] using difference approximation.
      iii. Project the gradient vector g on to the null space of matrix B to obtain the direction vector d := $g_{\perp B}$
      iv. Compute the optimal step length δ along the direction d.

$$\text{v.} \begin{bmatrix} \alpha_j \\ x_j \\ z_j \end{bmatrix} := \begin{bmatrix} \alpha_j \\ x_j \\ z_j \end{bmatrix} + \delta d$$

vi. $\text{newInnerObj} := \sum_{1 \leq j \leq N} h(\alpha_j b_j, x_j, z_j)$ endWhile
    d. i := i + 1; set $P_i$ := Next permutation matrix in the sequence
    e. B := $P_i I P_i^T$
    f. oldOuterObj := newOuterObj
    g. newOuterObj := newInnerObj
  endWhile
  3. Use rounding heuristics to set fractional $z_j$ variables to the nearest integer value to obtain variables $y_j$.
  4. Compute n := number of $\alpha_j$ that are greater than 0.
  5. Output the optimal solution:
    h. Output n as the number of family members
    i. For $1 \leq j \leq N$ Do
      i. if $\alpha_j > 0$ then
        a. output $\alpha_j b_j$ as the signature of person j
        b. output $x_j$ as the age of person j
        c. output $y_j$ as the sex of person j
      EndIf
    EndFor
END
END PROCEDURE Signature Aging The learning system also provides for remembering past behavior and integrating it into the current signature. The fundamental reason for remembering the past is to infer a recurring pattern in the user behavior, and use the inference to aid in future navigation. Exponential smoothing is a way of gradually forgetting the distant past, while giving more relevance to the immediate past. Thus, activities done yesterday are given more relevance than activities done two days ago, which in turn is given more importance than the activities done three days ago, and so on (see V. E. Benes, *Mathematical Theory of Connecting Networks and Telephone Traffic*, Academic Press, New York, 1965 for additional information, herein incorporated by reference). This technique has the added advantage of reducing the amount of computer memory consumed by the signature.

The learning system uses the concept of exponential smoothing in the context of learning the user's activities. For example, a set of activities for today is captured in a signature s, whereas all of the past activities are remembered in a signature s* (s* remembers all of the past, since the recurrence relation, given below, convolutes all of the past into a single signature). At the end of the day (when the present becomes the past), the system updates s* by the recurrence relation $$s^* = \alpha s + (1-\alpha) s^* \quad 0 \leq \alpha \leq 1 \quad \text{(Equation 20)}$$

In Equation 20, α is called the smoothing parameter and it controls how much of the past the system remembers, and how fast the past decays—larger the α, faster the decay. Expanding the above recurrence relation into a recurrence equation illustrates the machinery of exponential smoothing. Where s*(h) denotes the past signature after n days and $s^{(n)}$ represents the activities done during the $n^{th}$ day. Equation 20 expands into $$s^{*(n)} = s^{(n)} + (1-\alpha)s^{(n-1)} + (1-\alpha)^2 s^{(n-2)} + \quad \text{(Equation 21)}$$
$$\ldots (1-\alpha)^{(n-1)} s^{(1)} + \frac{(1-\alpha)^{(n)}}{\alpha} s^{(0)}.$$

Because α is ≤ 1, Equation 21 clearly shows that less weight is given to the activities of that past. In some embodiments, all signatures for each macro class (channel, genre, microgenre) are smoothed using the exponential smoothing technique. The determination of when to decay a particular signature is based on the dataspace of the signature and the nature of activities performed in the dataspace. For example, in the television dataspace, a decay period of one day is a suitable period because television shows typically reoccur on a daily basis. Whereas the decay period for the telephone dataspace would be longer so as to decay at a slower rate that the television dataspace. The decay parameter, or smoothing parameter α, can be selected to control the degree of decay of the past user behavior.

The learning system also uses an adaptive decay technique to integrate the past signature information with the most recent signature information. This adaptive decay technique is based on a hybrid chronological-activity based smoothing and provides improved results over strict chronology-based aging when applied to signatures that take into account the user's geographic location. This technique enables the influence of past activities to decay over time, while still preserving the past information during the user's absence from a particular geographic location for a stretch of time. In general, the past signature will be decayed if (1) a new activity has occurred in the geographic location and (2) the elapsed time since the last signature decay event is greater than a threshold. In essence, the system freezes the signatures when no activity is happening in a given location, effectively stopping time for that location. When next an activity occurs in that location, the system smoothes the signatures based on elapsed time.

If a traditional smoothing technique were employed to decay the memory of the past once per day, for example, the signature values may decay to zero if the user were absent from the geographic location for an extended period. Thus, upon returning to that particular location, the user would effectively have to "retrain" the system by rebuilding the signatures corresponding to that location. The adaptive decay technique avoids this problem.

An illustration of an implementation of the adaptive decay technique follows. As mentioned above, signature decay occurs for all signatures in coordinates (t, g, s) (i.e., time t, geographic location g, and dataspace s), only when there is a new activity in (t, g, s). In addition, a minimum time must elapse before decaying takes place. To account for long elapsed times, the system uses the concept of epoch time. Epoch time is the absolute local time since a certain distant past. The concept of epoch time can be found in current-day operating systems (e.g., Linux and WinCE) that fix a reference point in the distant past and return the elapsed time since that reference point. For the example below, T is the epoch time when some activity x happens in (t, g, s). Note that the coordinate t is an integer denoting the discretized time denoting the time-of-day or time slot, whereas T is an epoch time. For use in the Equation 22 below, β(t, g, s) is the decay threshold for signatures, r(t, g, s) is the last time, in epoch units, that signatures in (t, g, s) were decayed, and e(t, g, s) is a vector capturing a newly performed user action (i.e., current signature) with a duration/count metric (explained above) in position x and zeros in all other positions. This technique also uses the smoothing parameter α as described above. Equation 22, shown below, is one implementations the adaptive decay technique.

$$ks(t, g, s) = \begin{cases} \alpha e(t, g, s)[x] + \\ (1-\alpha)ks(t, g, s); & \text{if } T > r(t, g, s) + \beta(t, g, s) \\ ks(t, g, s) + \\ \frac{\alpha}{(1-\alpha)}e(t, g, s)[x]; & \text{otherwise} \end{cases}$$ (Equation 22)

Under this implementation, the system decays the signature if the time interval since the last decay is greater than the decay interval; in this case, the system performs a convex combination of the past activity and present activity. If the last decay has occurred more recently than the decay interval, then the historic signature is combined with the current signature, with a multiplier $\alpha/(1-\alpha)$ applied to the current signature. The technique of using this multiplier optimizes storage. Typically, when performing an exponential smoothing operation, the past is the period of time up to time r(t, g, s), and the present is the period of time from time r(t, g, s) to time T. Under a typical application, the new activity x would be stored in a temporary storage, ts(t, g, s), along with all additional subsequent activities, until the time r(t, g, s)+β(t, g, s). At that time, the smoothing formula would combine the past with the new activities according to Equation 23.

$$ks(t,g,s) = \alpha ts(t,g,s) + (1-\alpha)ks(t,g,s)$$ (Equation 23)

The system avoids the need for temporary storage by combining each new activity with the past signature as each new activity occurs, using the multiplier described above to offset what would otherwise be a premature composition. This ensures true exponential smoothing. Although the above discussion involved only the keyword signatures, ks, the same principles and techniques apply to all other signatures described herein.

Use of Signatures to Personalize Content

As mentioned above, one illustrative use of the learning system is to enhance the user experience during a search procedure. In one illustrative implementation, the various individual, aggregate, and program signatures reside on a server system that contains a set of content items (e.g., television programs, television channels, movies, etc.). The server system uses the signatures to personalize search results provided to users of the system. In particular, the results obtained through a query are identified and reordered by promoting relevance values of individual search results based on the set of signatures. For example, in a system employing an incremental search method (as described in the above incorporated U.S. patent applications), the system begins searching for content item results as the user enters letters of a text query. The system identifies content items as candidates for presentation based on comparing the letters of the text query with descriptive terms associated with the content items. Each of these content items is associated with a base relevance value that measures the popularity of the item in the overall population. The system uses these base relevance values to rank which content items are likely sought by the user. Higher base relevance values indicate a higher overall popularity, thus, these items are assumed to be of more interest to the user than items with lower base relevance values.

However, as explained in greater detail below, the system modifies the base relevance values based on the set of user signatures. Thus, if the set of signatures indicates, given the particular time and day of the search, that it is likely the user is searching for a program with the genre of news, the system will promote the relevance values of programs with a genre of news that match the user's query text. Likewise, the system can use the channel and microgenre data associated with the content items in conjunction with the channel and microgenre signatures to promote the base relevance values. The final relevance weights of each item determine if the item is included in the result set and help determine its position in a list of results. Many different promotion techniques can be implemented; one example is the "ruthless promotion technique", described below.

The ruthless promotion technique ensures that any particular search result item that has a nonzero probability in a user signature will have its relevance value boosted such that it will be higher than any other search result items having a zero probability value in the same user signature. For use in Equation 24 below, K is the number of search results retrieved with relevance numbers $r_1, r_2, \ldots, r_K$, and M is the maximum value any relevance can have, based on the general popularity of the search result. Typically, search engines assign a relevance number to query results based on ranks with some maximum bound. These ranks can be a measure of the popularity or relevance of the items based on popular opinion. Search results are displayed in the shelf space, sorted in descending order of relevance based on these ranks (Herein, the phrase "shelf space" refers to the portion of a display screen of a device that displays the search results in response to a user query. This portion can be organized as a column of text boxes in some implementations.) The values $p_1^{(1)}, p_2^{(1)}, \ldots, p_K^{(1)}$ are the channel signature probabilities ($0 \le p_i^{(1)} \le 1$) assigned by the learning system (typically, most of the $p_i^{(1)}$ will be 0). The superscripts on the probabilities refer to type of signature, e.g., channel, genre, or microgenre. The ruthless promotion technique computes new relevance numbers $\tilde{r}_1, \tilde{r}_2, \ldots, \tilde{r}_K$ as $$\tilde{r}_i = \begin{cases} \lfloor (M+1)e^{p_i^{(1)}} \rfloor; & p_i^{(1)} > 0 \\ r_i; & p_i^{(1)} = 0 \end{cases}$$ (Equation 24)

The search items are then reordered using the new relevance numbers. For example, a user had watched the channels "CARTOON NETWORK" and "COMEDY CHANNEL" in the past, with the signature probabilities 0.7 and 0.3 respectively. The generic relevance numbers for channels, based on popular opinion, are 500, 300, 100, and 70, for "CBS", "CNBC", "COMEDY CHANNEL", and "CARTOON NETWORK", respectively with a maximum bound of 1000. Table 1 and Table 2 show the displayed results and their corresponding relevance values, when a query character "C" is typed. Table 1 shows the order of the query results without the benefit of the learning system, and Table 2 shows the order of the results using the ruthless promotion technique. As can be seen, the user convenience is enhanced, because fewer scrolls are required to access the most likely watched channels.

TABLE 1

| Channel | Relevance Number |
| --- | --- |
| CBS | 500 |
| CNBC | 300 |
| COMEDY CHANNEL | 100 |
| CARTOON NETWORK | 70 |
| ... | |

TABLE 2

| Channel | Relevance Number |
| --- | --- |
| CARTOON NETWORK | 2015 |
| COMEDY CHANNEL | 1351 |
| CBS | 500 |
| CNBC | 300 |
| ... | |

Other promotion techniques are within the scope of the invention, including, for example, techniques that do not necessarily ensure that a search result item that has a nonzero probability in a user signature will have its relevance value boosted such that it will be higher than any other search result items having a zero probability value in the same user signature. In particular, because there are six signatures capturing the user activity at any time of day—channel, genre, and microgenre for given time slot, and their corresponding composite signatures, these signatures are combined to compute new relevance weights. Equation 24 above shows the use of channel signature for promotion. In the example below, there is an inherent importance in these signatures, from more refined to more coarse. This variant of the ruthless promotion technique considers an aggregated promotion formula, as follows:

$$\tilde{r}_i = \left\lfloor \sum_{1 \leq k \leq 6} (M+1)^k e^{p_i^{(k)}} \right\rfloor \qquad \text{(Equation 25)}$$

In Equation 25, the superscript on the probabilities, $p_i^{(k)}$ refers to time slot channel, microgenre, genre, followed by composite channel, microgenre, and genre signatures, with increasing values of k, respectively. Since they are being multiplied by powers of (M+1), a natural relevance importance is implied.

Signatures corresponding to overlapping periodicities are also combined to provide an aggregate signature for a particular time slot. The probabilities in the aggregate signature can be used with the promotion techniques above to identify and rank the results of search. In order to form an aggregate signature, the vectors from the overlapping signatures are added together and renormalized. For example, for a particular time slot, a user has a first signature with a periodicity of every Monday and a second signature with a periodicity of every weekday. The first signature is the genre vector {(0.2 news), (0.8 sports)}; the second signature is the genre vector {(0.1 comedy), (0.4 news), (0.5 sports)}. To form an aggregate signature, the system first arithmetically combines the two vectors to produce the new vector {(0.1 comedy), (0.6 news), (1.3 sports)}, and the system then normalizes the new vector by dividing each numerical element by the sum of the numerical elements of the vector, i.e., 2.0. Thus, the aggregate, normalized genre probability vector of the two overlapping signatures is {(0.05 comedy), (0.3 news), (0.65 sports)}.

Seminormalization of Signatures

In one implementation, the learning system uses integer arithmetic for relevance promotion computations. In particular, all probabilities are represented as integers, appropriately scaled. One compelling motivation for using integer arithmetic is to make the learning system portable to disparate hardware and operating systems, some of which may lack floating arithmetic.

The learning system uses a seminormalization approach to weight more recent activities more heavily in the signatures, while deemphasizing, but still retaining, the information from more distant activities in the signature. Thus, when personalizing services or content provided to the user, the system is more heavily influenced by more recent activities. The basic idea of this seminormalization approach is to make the long-term memory coarse-grained by bucketing small probabilities that result from less common user preferences and/or preferences captured in the more distance past, while still bounding the range of values by using a small relevance scale factor. This approach allows the system to capture both small and large probabilities without requiring a large dynamic range to define the probability bounds. Thus, a small scaling factor is used to distinguish between the relatively more probable activities in the captured in the signatures, while the relatively less probable activities are not lost due to truncation errors.

An illustrative technique for converting an unnormalized signature, x, into a seminormalized signature is provided below. In signature x, all elements $x_i$ are nonnegative integers, representing the activity intensity. Signature x is an N-dimensional vector, and x has at least one positive element. The value d is the infinity norm of x and $$|x|\infty \triangleq \sum_{1 \leq i \leq N} x_i;$$

thus, d is the normalizing sum. The vector p is the normalized probability vector corresponding to x; therefore, $$p_i = \frac{x_i}{d};$$

$1 \leq i \leq N$.

In order to seminormalize the signature x, the system uses a fine-grain memory threshold of probabilities, K, represented in log scale; i.e., K is a positive integer denoting a probability threshold $10^{-K}$. All probabilities $\geq 10^{-K}$ will be scaled in fine-grain, and all probabilities between 0 and $10^{-K}$ will be scaled in coarse-grain with bucketing. The system also uses a positive integer, S, as the seminormalization range represented in log scale. After seminormalization, a probability value of 1 is scaled to $10^S$. The largest value in the seminormalized vector would be $10^S$. Although not required, S can be equal to K. For use the in equations below, let $t=10^{-K}$, $l=K+2$, and $u=10^S$. Finally, y is the seminormalized vector corresponding to p. Thus, y=f(p, K, S), where f is the function implementing the seminormalization algorithm. The function f is not an invertible function.

Each element i of the seminormalized vector y is defined by the Equation 26.

$$y_i = \begin{cases} 1; & 0 \le p_i < 10^{-2K} \\ v+2; & 10^{(-2K+v)} \le p_i < 10^{(-2K+v+1)} 0 \le v \le K-1 \\ \frac{(10^K 1 - u)}{(10^K - 1)} + \frac{10^K(u-1)p_i}{(10^K - 1)}; & 10^{-K} \le p_i \le 1 \end{cases} \quad \text{(Equation 26)}$$

Figure 7:
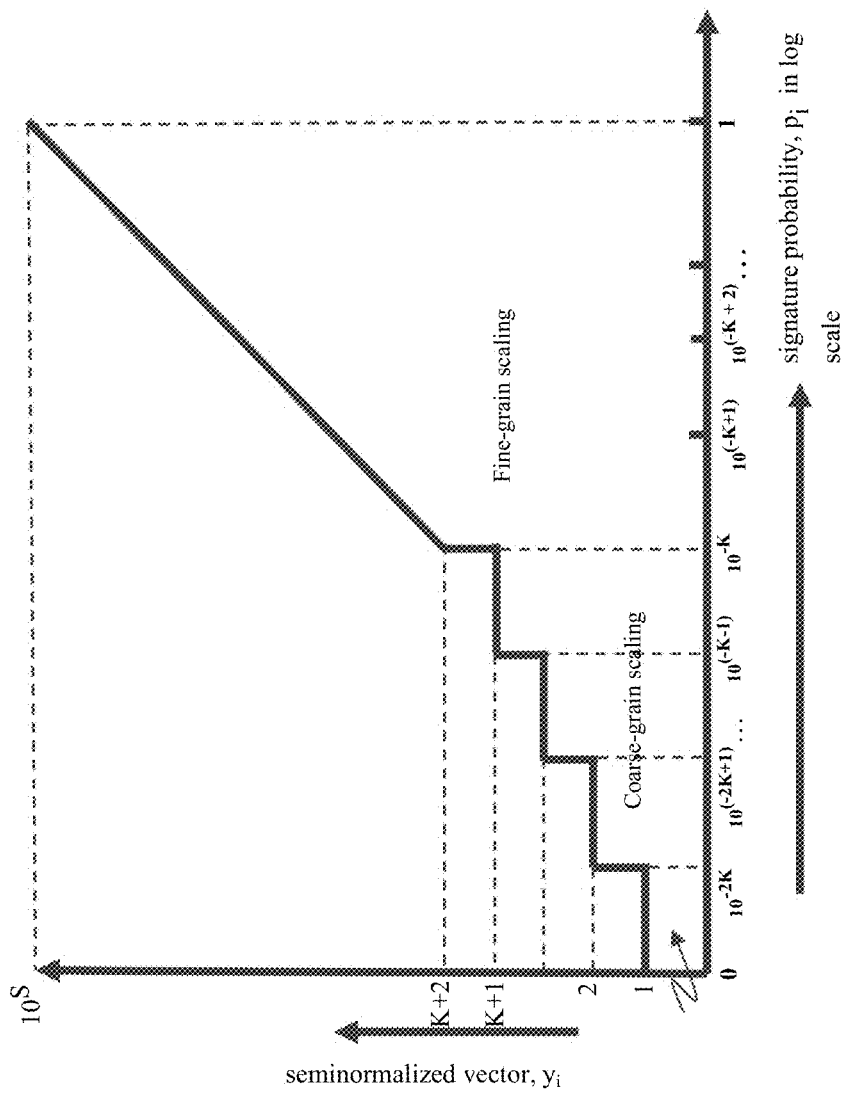
FIG. 7 illustrates seminormalization of signature probabilities.

The first 2 parts of Equation 26 define the coarse-grain bucketing, and the last part of the equation defines the fine-grain scaling. FIG. 7 shows a pictorial representation of Equation 26. The X-axis is shown in log scale. In FIG. 7, S=K, and there are K buckets of width 0.1. The buckets start with the bucket having a left boundary $10^{-2K}$ and ending with the bucket with the right boundary $10^{-K}$. There is a special underflow bucket for any probability $<10^{-2K}$. Each $p_i$ falling within a bucket is scaled to a fixed count. For probabilities larger than $10^{-K}$, the $p_i$ is scaled using a linear equation. The slope of the linear scaling equation in plot is approximately $10^S$ with the intercept at (K+2).

Figure 8:
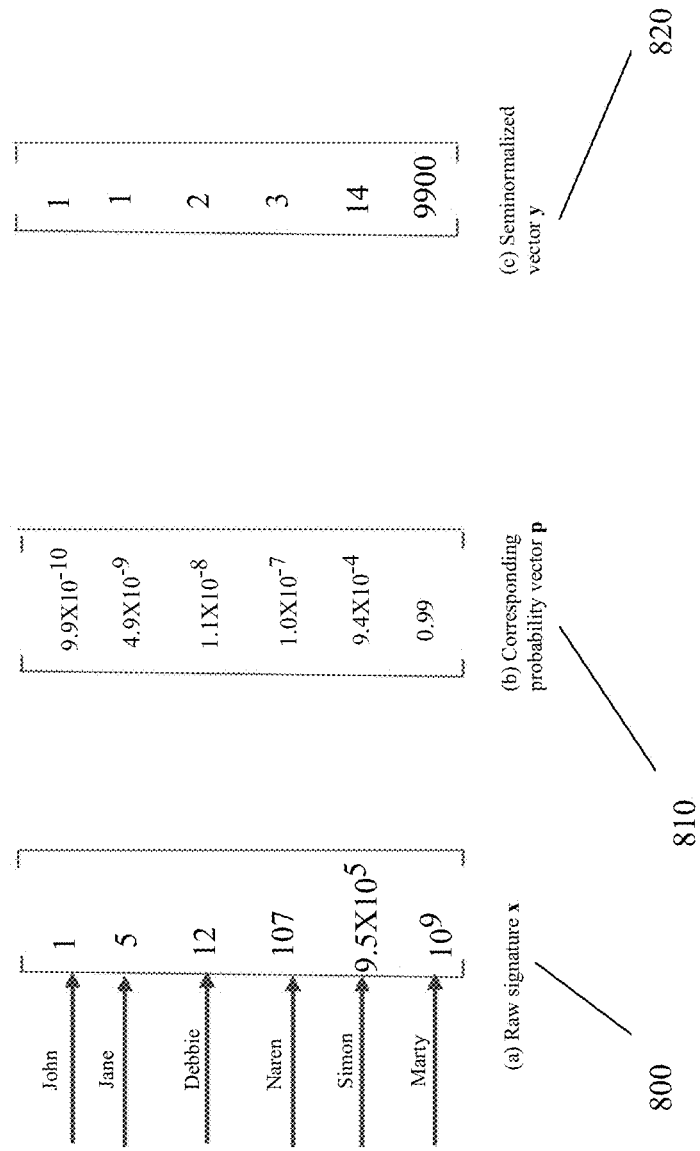
FIG. 8 illustrates an example of a seminormalized signature.

An example of this approach as applied to an electronic phonebook application on a mobile phone is provided below. In this example, each outgoing call is counted and stored in a raw signature. The system scales the call counts by a large number so that truncation errors in the smoothing and aging process, due to integer arithmetic, are reduced. FIG. 8 illustrates a raw phonebook signature 800 with 6 entries. The row names in signature 800 indicate the person called, and the values are the scaled frequency, after aging and smoothing. Thus, the value 1 represents the long-term memory of a phone call made to John, perhaps many years ago, and not repeated again. Similarly, the entry corresponding to Jane has a signature value of 5. This value can be interpreted two ways: (1) Jane was called as long ago as John, but with a frequency five times greater than John; or (2) Jane was called more recently with the same frequency as John. The larger values represent short-term memories of calls made in the recent past. The normalized probabilities of these events are shown in a probability vector 810.

It is clear the dynamic range of probability vector 810 is quite large. Using the techniques described above, with K=S=4, the system generated a seminormalized vector 820. The system has collapsed the memory of John and Jane into the underflow bucket, thus making them indistinguishable. Some differentiation has been made for Debbie and Naren, although these entries also represent long-term memories, and therefore, the exact difference in frequency or recency of calls is not retained. However, the system captures the precise relative values of Simon and Marty. The values in the seminormalized vector are completely bounded and suitable for stable relevance promotion.

Activity Spike Detection

The learning system is also useful for detecting sudden bursts of activity (i.e., spike detection) at a particular time and day for a particular search item, e.g., a certain television channel. The system can use these spikes of activity to temporarily boost the base relevance values of particular items that have sudden popularity. Typically, spikes happen when an emergency or crisis has happened in the recent past. For example, if a particular news channel is presenting a late-breaking news story that is attracting a high number of viewers, the system will recognize the sudden popularity of the news program and boost its base relevance in recognition of the fact that other users of the system may also be interested in the news story.

In general, when the collective activity level associated with a particular content item is above a certain threshold attributable to statistical variations, then the activity level is considered a spike. The learning system analyzes the current and past activity levels by collectively examining all of the signatures of the user population. If each user is considered an independent random variable whose probability of watching a program is encoded in a stochastic signature, then the collection of all these independent random variables provides a measure of the overall popularity of the content item. Thus, the system employs these signatures to derive a joint probability distribution of the number of users watching a given program at a given time. Thus a new type of signature, herein a "program signature", $r_k^{(i,t)}$, is defined in Equation 27.

$r_k^{(i,t)}$ := Probability that a program $i$ is being watched by k users at time t; $0 \le k \le N$ (Equation 27)

An example of a technique for obtaining the program signature is provided below. In general, when the activity level associated with a particular content item exceeds a certain inherent randomness value predicted by the program signature, the system identifies such activity as a spike.

The system creates a set of program signatures, each of which is a statistical convolution of all individual signatures in the population that have watched the particular program. By convolving the individual signatures, the system creates an aggregate mean and standard deviation of the activity level associated with the given program. Thus, a program signature captures the fraction of all of the current users interacting with the system that are currently watching the given program. Because the number of users interacting with the system changes over time, the fraction of users watching a particular program changes over time as well. The system captures this information by creating program signatures for the various time slots.

These signatures estimate the mean and higher moments of the probability distribution of the number of people accessing this program in terms of fractional probabilities. The aggregate signature and related statistical measures define the normal level of activity for the particular search item. Thus, by continually monitoring the current level of activity for the particular search item at a given time, the system can detect if the current activity is above or below the normal level. If the activity exceeds a certain threshold, the system adjusts the reordering technique to temporarily boost the relevance of the particular search item to recognize that the item may be of particular interest.

An example of creating an aggregate signature is provided below. For the sake of simplicity, the example is restricted to one day, one time slot, one content item, i, and a single category of signature (e.g., channel, genre, or microgenre). This technique for finding the aggregate signature is applied to all time periods, all days, all search items, and all signatures. In the following example, N is the number of users using the system, $q_i^{(j)}$ is the normalized signature value of user j for item i (i.e., the fraction of time user j watched program i) where $1 \le j \le N$, $\psi$ is the index set $\{1, 2, \ldots, N\}$, $\Phi_m$ is the set of subsets of $\psi$ of size m where $0 \le m \le N$, and X is a random variable denoting the number of users currently watching program i.

The unnormalized probability that there are m users watching program i, herein $r_m$, is determined by Equation 28.

$$r_m = \sum_{\Theta \in \Phi_m} \prod_{1 \le k \le m} q_i^{(j_k)}, \text{ where } \Theta = \{j_1, j_2, \ldots, j_m\} \quad \text{(Equation 28)}$$

The normalization constant, G, is given by Equation 29.

$$G = \sum_{0 \le m \le N} r_m \quad \text{(Equation 29)}$$

The probability density function of X, $f_X(m)$, the mean of X, $\mu_X$, and the standard deviation of X, $\sigma_X$ are now given by the following equations:

$$f_X(m) = \frac{1}{G} r_m; 0 \le m \le N \quad \text{(Equation 30)}$$

$$\mu_X = \sum_{0 \le m \le N} m f_X(m) \quad \text{(Equation 31)}$$

$$\sigma_X = \sqrt{\sum_{0 \le m \le N} (m - \mu_X)^2 f_X(m)} \quad \text{(Equation 32)}$$

The system monitors the number of users watching program i. Chebychev's inequality dictates that, with 96% confidence, the random variable X cannot be above $\mu+5\sigma$ due to inherent randomness. Thus, whenever the number of users watching program i goes beyond $\mu_X+5\sigma_X$, the system identifies this as a spike of activity. The system can temporarily boost the base relevance of program i in queries for which program i is a candidate in recognition of the fact that the user may be interested in the same program. The relevance can be boosted by a predetermined amount, or it may be boosted by an amount that is proportional to the increase in viewing of the program. In addition, the system can use a variety of multiples of $\sigma_X$ (not only $5\sigma_X$) to determine when a spike of activity is occurring.

The system can also infer the overall relevance of particular search items using the aggregate signatures. As described above, the system computes the mean of the statistical convolution of N signatures, N being the number of system users. Using this mean value, the system generically reorders the search results even in the absence of a signature for a particular user. Thus, the user benefits from the systems knowledge of the popular option of various search items, and these popular opinions are used to identify and order search results for presentation to the user. For example, if the aggregate signature has a large mean for the television program "The Apprentice", then any user who does not have a personal signature will have this item in the top shelf on an appropriate query (the query, for instance, can be "trump", which is a microgenre of the program "The Apprentice").

Figure 9:
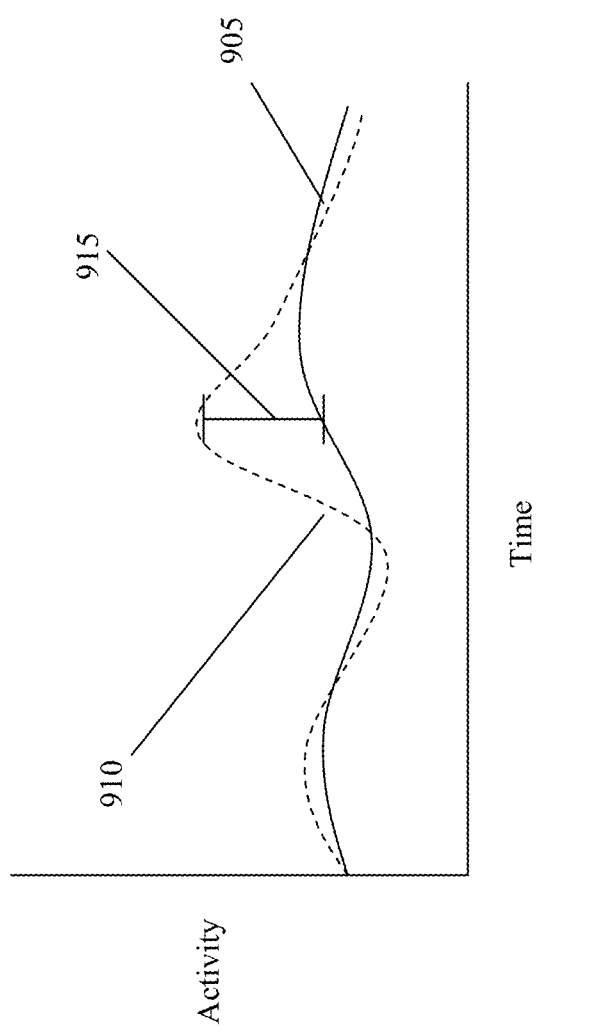
FIG. 9 illustrates an example of detecting an increased level of activity associated with a content item.

FIG. 9 illustrates an example of detecting an increased level of activity associated with a content item (i.e., an activity spike). A normal level of activity 905, as determined using the techniques described above is shown. Normal level of activity 905 is based on the aggregate signatures. As the system is being used, a current level of activity 910 is generated using continuously calculated aggregate signatures based on the current content items usage or activity. Upon detecting an increase in activity level 915, which is beyond a specified threshold, the system identifies the content item as having a spike of activity, and the system promotes the ranking of that content item, as described above.

The learning system also allows accessing rare search items using preprocessing. In some implementations described above, the search engines work by first gathering significant amounts of results matching the query, and filtering out low relevance results before applying a promotion technique. This technique has several advantages, including increasing the speed of the system and reduces network bandwidth required. However, a specific user may be interested in an item having low overall popularity that is filtered out of the results before applying a promotion technique. In the absence of a signature, this rare item may never me presented in the search results (this rare item is sometimes referred to as the "long tail" in the probability distribution sense).

In order to capture the rare item in the ordered search results, some implementations of the system compute the relevance before filtering, using the promotion techniques described above or other promotion techniques. Thus, the rare item is ranked highly for the particular user, allowing him or her to access the item with ease. Here, signatures enable fine-grain customization and increase user satisfaction.

An inherent feature of the stochastic signature mechanism is the probabilistic nature of the signature entries, i.e., the signature entries are all normalized probabilities. This enables the system to export the signatures to other, potentially unrelated systems, with ease. For example, over some period of time, the television system interface described above learns that, in general, a given user prefers the Spirituality genre 50% of the time, Sports genre 40% of the time, and the Seinfeld show 10% of the time. In response, the system creates a set of signatures for the user that captures these preferences. The user can elect to share this signature information with other systems.

Therefore, when the user registers with a website that sells books, the user can elect to share his signature information with this website. Because the signature information is stored in terms of normalized probabilities, the signature can be easily imported into the website that is configured to utilize such probability information. In addition, the website need not have an identical set of genres as that of the television system in order to use the signature information. For example, the website may not have "Seinfeld" defined as a genre or category of books. In this case, the website can simply renormalize the signature by removing the irrelevant entries, i.e., Seinfeld, and determining new normalized probabilities for the remaining genres. Thus, the new normalized probabilities for the user would be 56% for Spirituality and 44% for Sports. Sharing signatures in this way obviates the need for relearning in the new system. Also, different subsets of signatures can be shared for different systems.

Signature Based Preference Service

As explained above, the learning system captures the user's preferences across multiple dataspaces. In addition, portions of the learning system can be incorporated into various user client devices, thereby enabling the system to capture the user's preferences across multiple devices. For example, the system can track the user's actions performed on a mobile telephone, a television system, a handheld computer device, and/or a personal computer. This enables the system to provide personalized services to the user across the multiple dataspaces and multiple devices. Thus, user preferences expressed on one device can be used to personalize the user interactions on a different device.

Likewise, the learning system can provide the learned user preferences captured in the various signatures to third-party service providers. The information provided to third-party service providers allows the service providers to personalize the services for the user outside of the learning system. In such an implementation, the learning system determines what preference information to provide to the service providers based on the nature of the services provided. The learning system can provide this information on a per transaction basis, or the system can periodically synchronize a set of signatures stored by the third-party service provider. Furthermore, the user can configure the learning system so as to control which third-party service receives user preference information.

By providing a centralized system that learns and stores the user's preferences, the learning system enables the user to avoid creating disconnected pockets of personalization associated with only one particular dataspace or device. Therefore, a user may immediately leverage the preference information contained in the user's signatures when interacting with a new service rather than having to wait for the new service to learn the user preferences. Thus, the learning system can provide personalization information to the third-party service provider to improve the user's experience with the service.

This comprehensive personalization across diverse user activities and devices is especially helpful to the user when the user interacts with the same service provider using different interface devices. Not only does the learning system capture the user's preferences from these diverse interactions, but the system also stores the details of the user's transaction for later retrieval by the user. For example, a user can book a flight through a travel website using a personal computer. The learning system captures the detailed information associated with transaction, e.g., the date of travel, the time of the flight, and the departure and destination city. At a later time, the user wishes to modify the travel reservations, and elects to do so using a mobile telephone. Because the system monitors the user's interactions with various service providers, the system recognizes that the user has placed a telephone call to the travel service. In response, the learning system automatically presents the user's upcoming travel itineraries on the user's mobile telephone or sends the information to the travel service's customer service agent with the user's consent.

In the alternative, if the user is presented with an automated voice response system, the learning system can send the relevant itineraries to the travel service (e.g., via an SMS message dispatched to the telephone number called or DTMF tones at the beginning of the telephone call), which would provide the travel service with a background context of the telephone call to improve the automated voice response system's response to the user voice commands. The power of a comprehensive personalization across diverse user activities and devices becomes very evident in voice based navigation applications. Comprehensive personalization can provide the necessary context that can vastly improve ambiguities in user input that plague these types of systems today.

Figure 10:
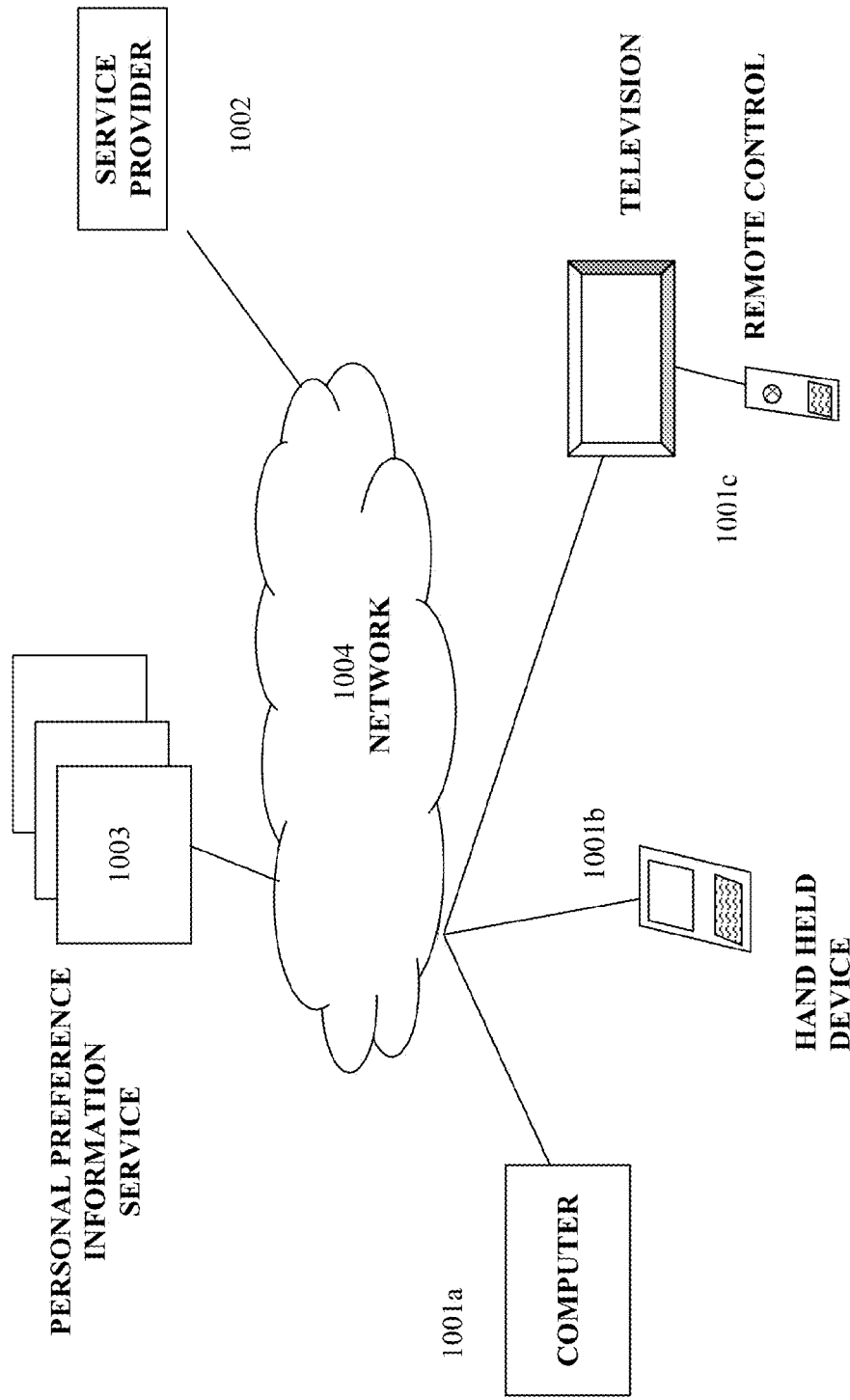
FIG. 10 illustrates a context-specific personal preference information service.

FIG. 10 illustrates a part of the learning system for providing a context specific personal preference information service. In a preferred embodiment, a user device 1001a-c solicits a service, on behalf of the user, from a service provider 1002. This can include, for example, making a telephone call to modify a travel itinerary or accessing a search engine to find some information. The context-sensitive personal preference information service 1003 enables the external service provider 1002 to provide a targeted response to the user based on user's prior activity, data access history, and the learned user preferences.

Service provider 1002 can also serve as the source of information and relevance updates for user device 1001a-c. A network 1002 functions as the distribution framework and can be a combination of wired and wireless connections. The navigation devices can have a wide range of interface capabilities and include such devices as a personal or laptop computer 1001a, a hand-held device 1001b (e.g. phone, PDA, or a music/video playback device) with limited display size and an overloaded or small QWERTY keypad, and a television remote control system 1001c, wherein the remote control has an overloaded or small QWERTY keypad. The navigation devices provide user activity data to the learning system via personal preference information service 1003 to create the various signatures. As mentioned above, in alternate embodiments, the user device can create the various signatures, and the signatures can be kept on the device. This enables the device to locally filter and order content items received from service provider 1002 and/or content items that reside on the device itself.

Figure 11:
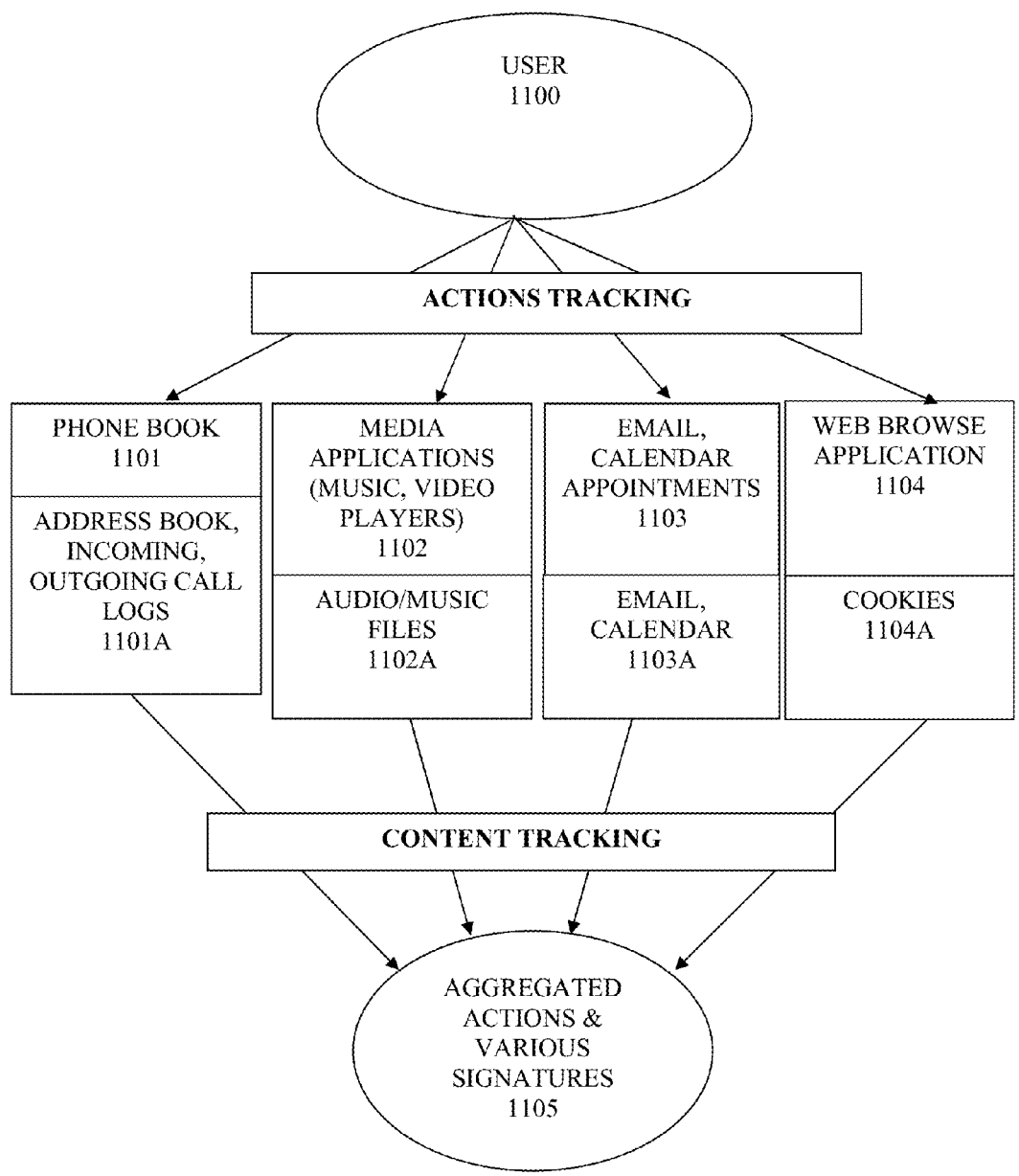
FIG. 11 illustrates the local tracking and strengthening of the personal preference signatures based on user activity and the content on a mobile device.

As described above, the learning system captures the user's preferences from the user's interactions with various dataspaces. FIG. 11 illustrates the local tracking and strengthening of the personal preference signatures based on user activity and the content on a mobile device. For example, user interaction with a telephone book 1101, media applications 1102, email/calendar 1103, and web browser 1104 are tracked, as well as when and where the interaction takes place. In addition to the user's interaction with these applications, the content that is coupled with these applications such as call logs 1101A, music files 1102A, email data/calendar appointments 1103A, and browser cookies 1104A are also tracked to capture the user's preferences. Aggregated actions and various signatures 1105 are captured by the learning system as described above.

The aggregated data and signatures 1105 are used by a wide variety of services, ranging from a local data prefetching service, in order to improve search performance, to a commercial third-party service provider, in order target the user for a specific product offering. The sets of signatures generated by the learning system form an onion-like layered structure; the inner layers are specific and capture the exact details of the user's actions, while the outer layers characterize the user's general preferences. For example, the inner layers capture (1) the time and the location where the user performed an action, (2) the nature of the action (e.g. tuning to a channel or the purchase of a book, DVD, or airline ticket), and (3) the details of the action (e.g. the channel and/or program the user tuned to, the title of book the user ordered, or the departure and destination airports of an airline ticket purchase). This layered structure coincides with the various signatures created by the learning system. The inner layers correspond to the microgenre and keyword signatures, while the outer layers correspond to the genre signatures.

The service provider requesting the user's signature information can designate the degree of specificity of user preferences desired. For example, a video content search engine wishing to use the user's signatures to order the results of a query may request specific information on which channels or program the user watched. A bookstore, on the other hand, may request broad user preferences of book tastes. The personal signature information sent in the later case would not be the individual instances of purchased books, but rather the broad user preferences at a genre level.

Figure 12:
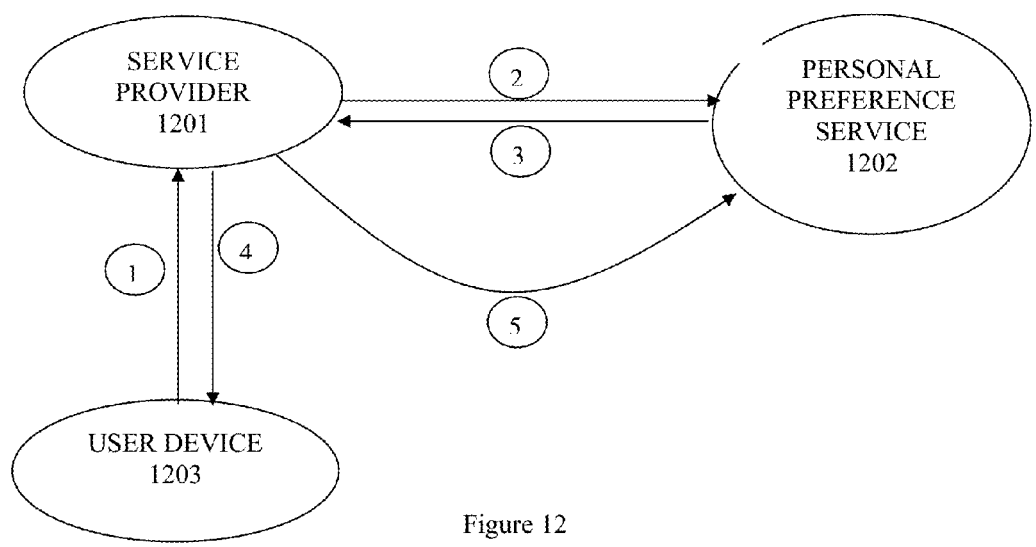
FIG. 12 illustrates the information flow when a user device makes a request to a service provider.

FIG. 12 illustrates the information flow when a user device 1203 makes a request to a service provider 1201 (step 1). The request contains a unique identifier that identifies the user or the user device. The identity could be an anonymous yet unique identifier of the device. For example, a one-way hash function of the device hardware identifier may be used to uniquely identify the device; there would be no way to reverse map to the actual device that generated the response, given the one-way nature of the hash function. In this case, the personal preference service 1202 has only have a set of unique device identifiers that share signatures for each user; there would be no identity information beyond the identifiers. In this way, the user's identity is maintained anonymous, yet responses matching user's preferences can be delivered.

In addition to the substance of the request, the communication from user device 1203 to service provider 1201 contains information that describes the context of the request, as explained below. Service provider 1201 communicates the substance of the request and the additional context information to personal preference service 1202 (step 2). The context information includes the identifier of the user device currently being employed, the location of the user device, if available, the time of the request, and general description of the action the user is performing (e.g., the fact the user is currently using a telephone versus playing media). The additional context information enables personal preference service 1202 to provide context-sensitive personal preference information to service provider 1201. Descriptive tags are assigned to the various actions the user can perform using the system. The system associates these descriptive tags with the signatures that are generated by the corresponding actions. In this way, personal preference service 1202 sends relevant preference information based on the tags sent by user device 1203 to service provider 1201 (step 3).

The relevant personal preference information is used by the service provider 1201 to send a targeted response to the user device 1203 (step 4). Additionally, service provider 1201 sends feedback to personal preference service 1202 about the targeted response that was sent (step 5). This feedback is used by personal preference service 1202 to adjust the personal actions signature of the user.

By disaggregating personal preferences through a standalone entity, i.e. personal preference service 1202, multiple service providers that provide different services can all benefit from the aggregated personal preference accrued across different service providers, different user actions, and different user devices. The end user gains immensely due to the key benefit of having targeted responses to many different types of requests. For example, a user who purchases books from Amazon.com gets the benefit of a targeted response when he goes to the Barnes & Nobles site using the techniques described above.

As described above, personal preference service 1202 can also be a centralized aggregator of user actions across different devices. Thus, user actions performed on different devices, e.g., a mobile computing device, a home television with set-top box, and a personal computer, could all be aggregated to provide user preferences for identifying and ordering search results. For example, a user could initiate a remote recording for a favorite program using a mobile device, where the discovery of the desired program can be made easy by leveraging the user's viewing behavior on a television system. Thus, the available episodes of Seinfeld could be automatically displayed in the mobile device, for example, based on the fact that the user has viewed Seinfeld many times in the past on the television system.

Figure 13:
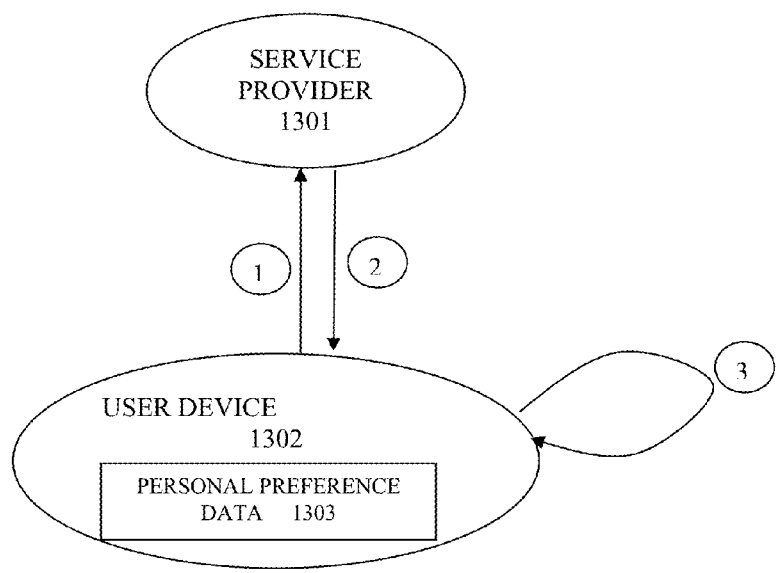
FIG. 13 illustrates an alternate information flow when a user device makes a request to a service provider.

FIG. 13 illustrates the information flow when a user device 1302 makes a request to a service provider 1301. In this scenario, the context sensitive personal preference information is sent along with the request (step 1) to generate a response (step 2). The personal preference data 1303 is locally resident on user device 1302. Additionally, personal preference data 1303 is updated (step 3) based on the response received from service provider 1301.

In another implementation of the learning system, a user device can serve as the personal preference provider in a peer-to-peer fashion for other user devices. For example, in a home entertainment network with more than one DVR (Digital Video Recorder), one DVR can serve as the personal preference provider for another DVR resident in the same home. When the user performs a search for content on a particular DVR, the other DVR in the home provides a personalized preference service to enable the user to find the desired content more quickly by leveraging the prior user viewing habits across the different DVRs.

In addition, a particular user can elect to share his or her signatures with another user. This can be accomplished in a peer-to-peer fashion as described above. In this case, the preferences learned for one user are used to personalize content results for another user. For example, the system will generate a set of signatures for a first user while that user selected various content from a book dataspace. These signatures encode the book reading preferences of the first user. A second user has a similar interest to the first user, and the second user wishes to select books related to similar topics as the first user. In this case, the first user can share his signature with the second user. The system then uses the first user's signatures to personalize the content results for the second user. In this way, the system enables the second user to benefit from the learned preferences of the first user without the second user having to train the system.

Figure 14:
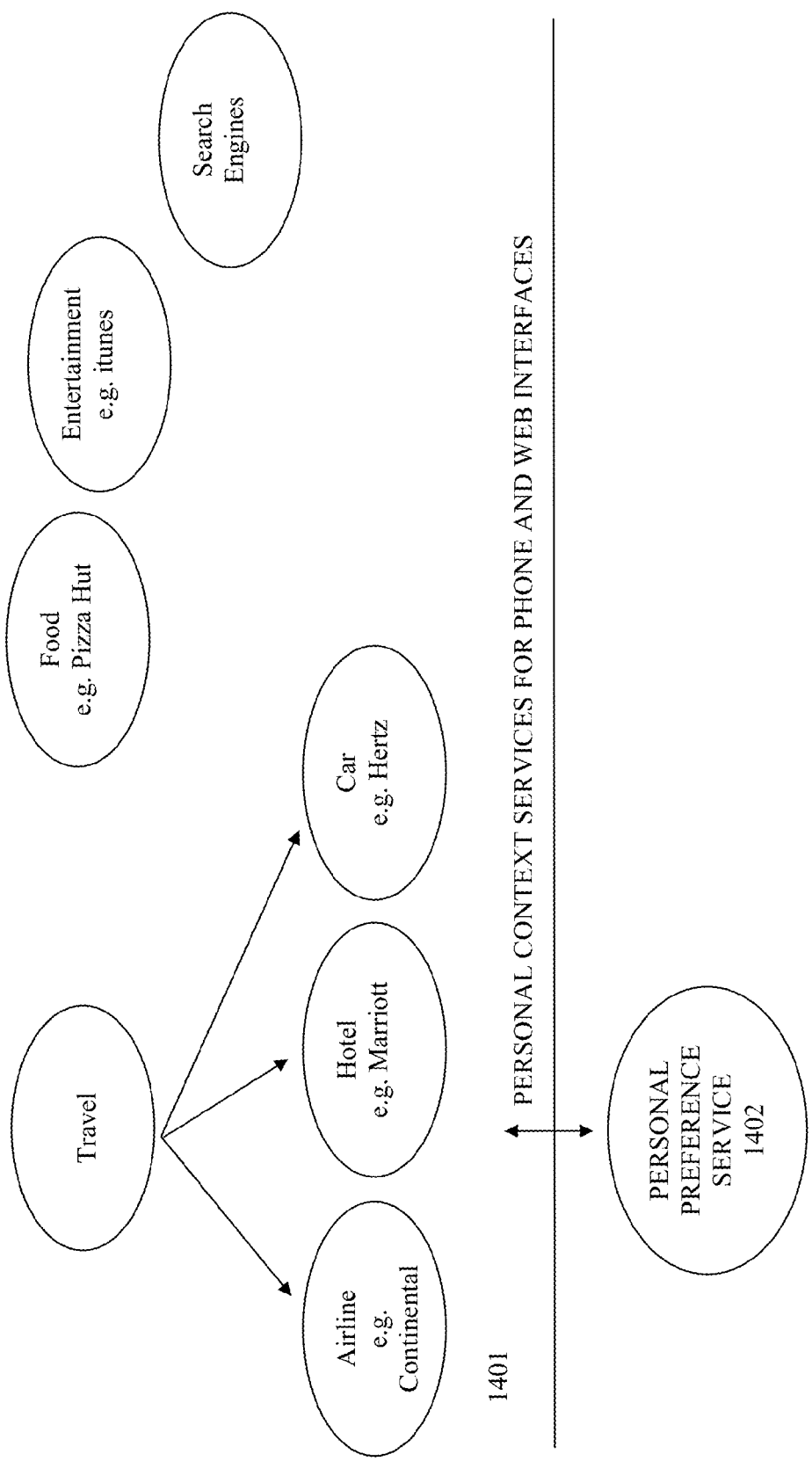
FIG. 14 illustrates examples of services that benefit from the context-sensitive personal preference service.

FIG. 14 illustrates different services 1401, for example, travel services (airline, car, and hotel), food services, entertainment services, and search engines services, that benefit from the context-sensitive personal preference service 1402. Although each service provider may have its own personalized services, when users first identify themselves, the services have no knowledge of the first time customer. The techniques disclosed herein increase the likelihood of the acquiring and retaining first time customers by offering targeted services immediately upon using the service. The techniques disclosed also enhance the first-time user experience. In contrast, without these techniques, users would have to create an account with a service and build an action history with that service before receiving personalized services.

Using the techniques described above, a user, for example, can go to any travel site and the site, without knowing the user and without requiring him to create an account or log in, can still offer the user personalized services based on the history of prior travel actions the user took on other platforms or web sites. Additionally, for services where comprehensive personalization is not in place, these services can leverage the personal preference service discussed above.

Figure 15:
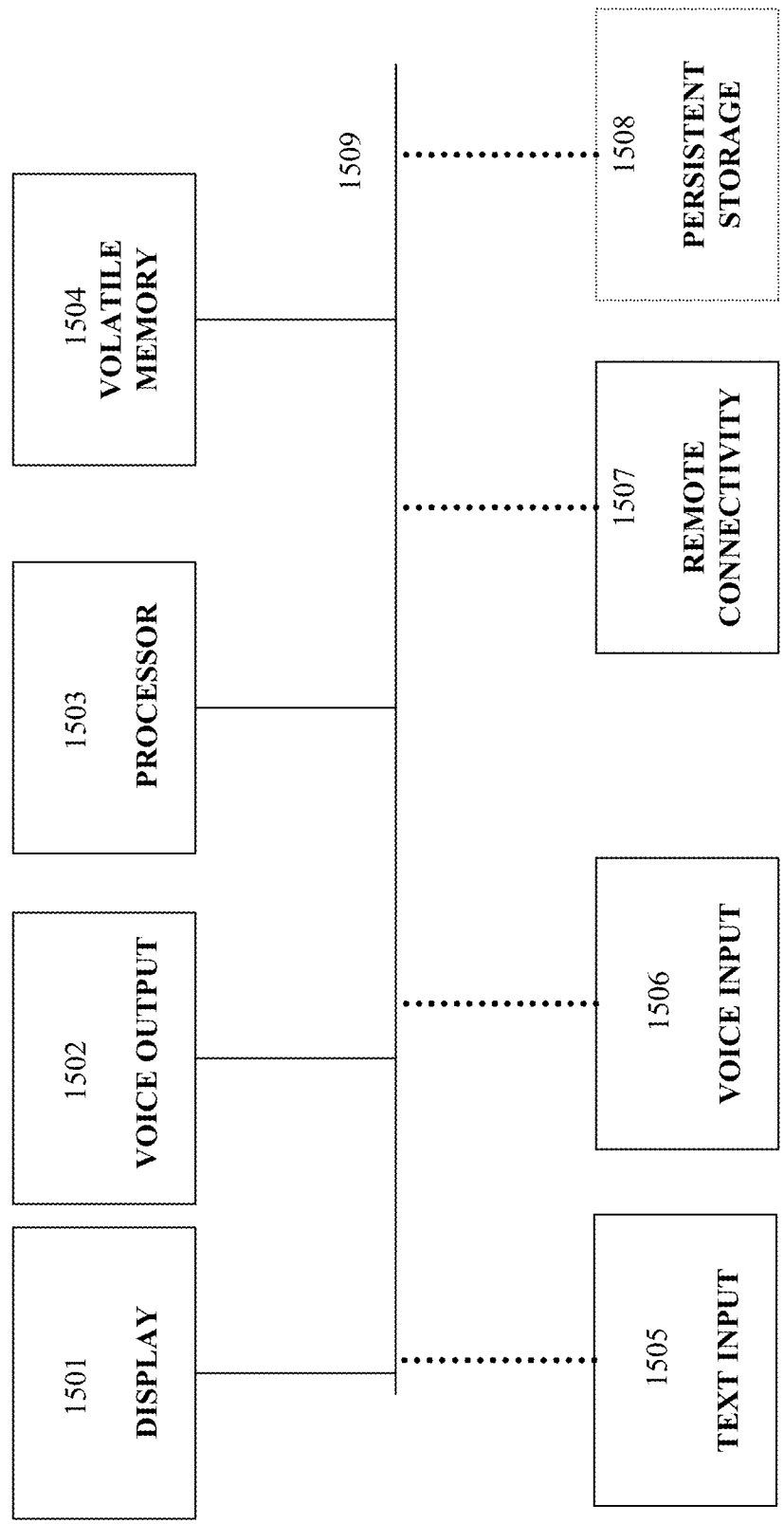
FIG. 15 illustrates possible user device configurations for use with the learning system and the context-sensitive personal preference service.

Because the learning system and personal preference service operate across multiple dataspaces and multiple user devices, the user device configuration can vary greatly. FIG. 15 illustrates possible user device configurations for use with the learning system and the context-sensitive personal preference service. In one configuration, a user device 1509 can have multiple output capabilities, for example, a display 1501 and/or a voice output 1502. In addition, user device can have a processor 1503, volatile memory 1504, a text input interface 1505, and/or voice input 1506. Furthermore, user device 1509 can have remote connectivity 1507 to a server through a network and can have persistent storage 1508.

In another user device configuration, user device 1509 may not have local persistent storage 1508. In such a scenario, user device 1509 would have remote connectivity 1507 to submit the user's request to a server and retrieve responses from the server. In yet another configuration of user device 1509, the device may not have remote connectivity 1507. In such case, the learning system, personalization database, and signatures are locally resident on local persistent storage 1508. Persistent storage 1508 can be a removable storage element, such as SD, SmartMedia, or a CompactFlash card. In a configuration of user device 1509 with remote connectivity 1507 and persistent storage 1508, user device 1509 can use remote connectivity 1507 for a personalization data update or for the case where the personalization database is distributed between local persistent storage 1508 and a server.

It will be appreciated that the scope of the present invention is not limited to the above-described embodiments, but rather is defined by the appended claims, and these claims will encompass modifications of and improvements to what has been described. For example, embodiments have been described in terms of a television content system. However, embodiments of the invention can be implemented on a mobile phone to assist the user in retrieving personal contact information for individuals.

What is claimed is:

1. A user-interface method of providing to a first content system preferences learned from user interactions with at least one second content system, the method comprising:
    monitoring user interactions with the at least one second content system, the at least one second content system having a set of content items, each content item having at least one associated descriptive term to describe the content item;
    analyzing the descriptive terms associated with content items with which a user interacted to learn the user content preferences for the content of the at least one second content system and associating at least one of a user identifier and a device identifier with the learned preferences; and
    in response to a request from the first content system for content preferences associated with at least one of a specified user identifier and a specified device identifier, providing the learned preferences associated with a matching identifier.

2. The method of claim 1, wherein the at least one of the user identifier and the device identifier is an encrypted identifier.

3. The method of claim 2, wherein the encrypted identifier is encrypted using a hash function.

4. The method of claim 1, wherein the at least one second content system is on a user client device.

5. The method of claim 4, wherein the monitoring user interactions monitors the user interactions with a plurality of second content systems, each second content system of the plurality being on a single corresponding user client device.

6. The method of claim 1, wherein the first content system is on a server system remote from the user.

7. The method of claim 1, wherein the first content system and the at least one second content system are different systems.

8. The method of claim 1, wherein the at least one second content system relates to at least one of a phone, phone book, address book, calendar, downloadable media content, television, travel, web, and book dataspaces.

9. The method of claim 1, wherein the first content system has not characterized the content preferences of the user.

10. The method of claim 1, wherein the learned content preferences are stored on a user client device.

* * * * *